United States Patent [19]

McClughan

[11] 3,902,249
[45] Sept. 2, 1975

[54] CALIPERS
[75] Inventor: Joseph Wm. McClughan, Houston, Tex.
[73] Assignee: Smith International, Inc., Midland, Tex.
[22] Filed: June 28, 1973
[21] Appl. No.: 374,404

[52] U.S. Cl............ 33/174 L; 33/143 L; 33/147 L; 33/178 E
[51] Int. Cl........................... G01b 7/12; G01b 7/04
[58] Field of Search........... 33/147 N, 147 F, 147 L, 33/143 L, 178 E, 174 L

[56] References Cited
UNITED STATES PATENTS

| | | | |
|---|---|---|---|
| 2,403,896 | 7/1946 | Aller | 33/147 N |
| 2,810,200 | 10/1957 | Delaney | 33/147 F |
| 3,007,252 | 11/1961 | Munn | 33/178 E |
| 3,042,909 | 7/1962 | Pistoles | 33/147 N |
| 3,103,072 | 9/1963 | Golley et al. | 33/143 L |
| 3,169,323 | 2/1965 | Hold | 33/147 N |
| 3,500,547 | 3/1970 | Van Haagen | 33/143 L |
| 3,513,553 | 5/1970 | Dame | 33/147 L |

FOREIGN PATENTS OR APPLICATIONS
1,095,526   12/1960   Germany .......................... 33/147 N

*Primary Examiner*—Richard E. Aegerter
*Assistant Examiner*—Richard R. Stearns
*Attorney, Agent, or Firm*—Murray Robinson

[57] ABSTRACT

A drill pipe calipering apparatus includes two hand held calipers for calipering the pin and box tool joints, an automatic caliper through which the pipe is fed to caliper the tube, bridge circuit means to convert caliper position to a proportional voltage, and a console whereat maximum departure from a preset nominal of pin, box and tube diameters are digitally displayed together with grade-indicators respecting pin, box and tube, there being telemetering means to signal between the hand held calipers and console to advise the operators when the console is clear to receive information and when it is in a hold condition unreceptive to further information. The automatic caliper is associated with the floating head of a magnetic flaw detector.

7 Claims, 44 Drawing Figures

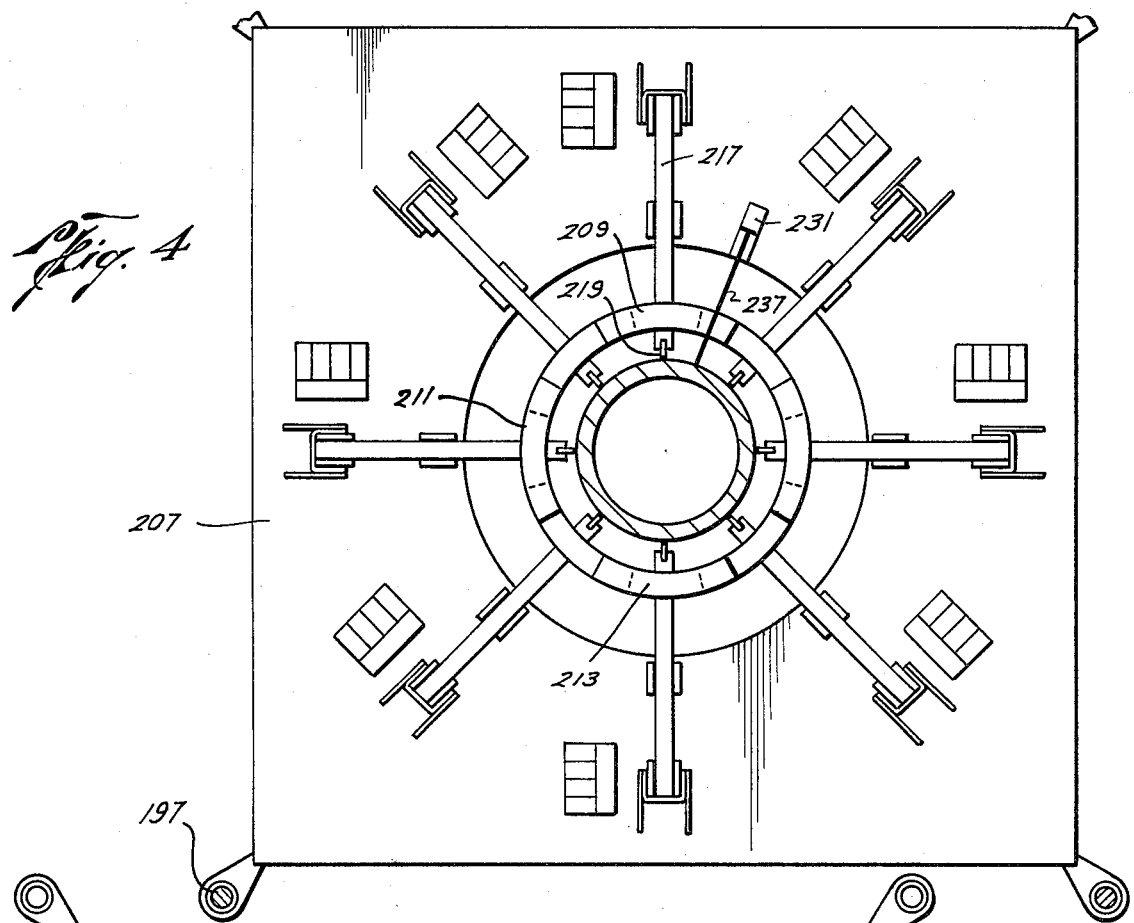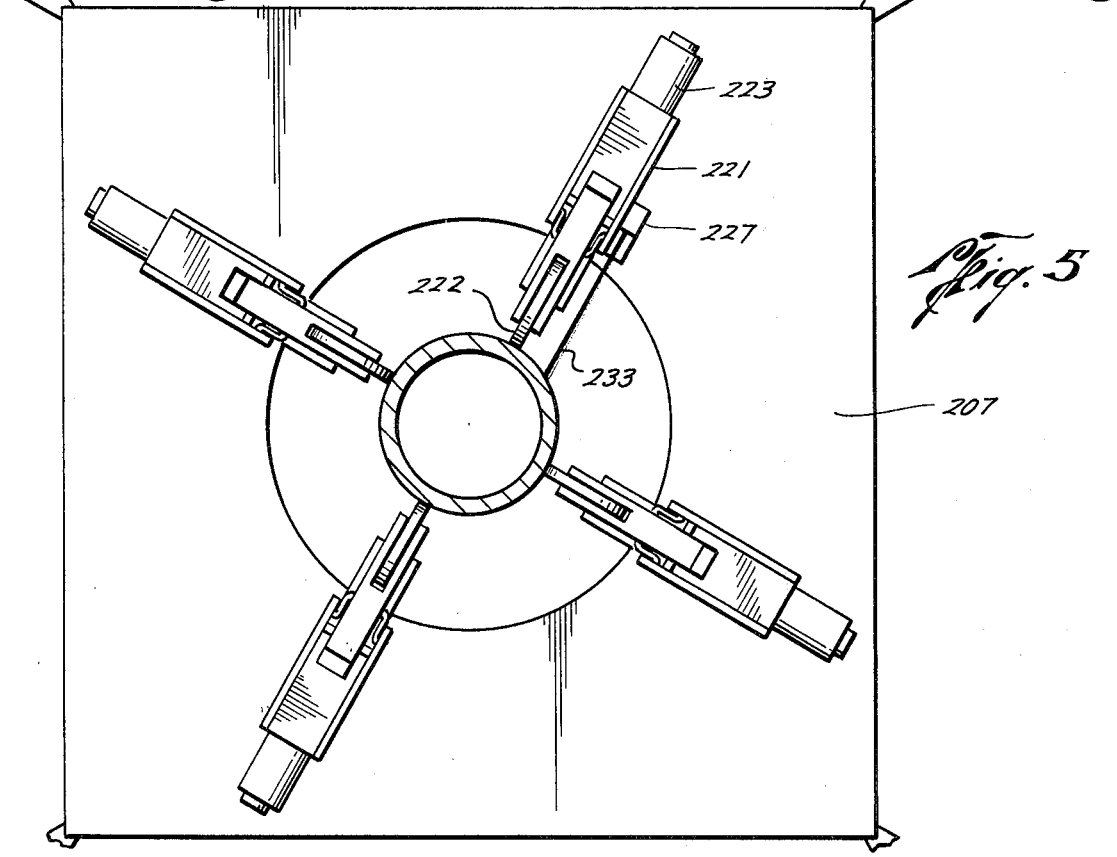

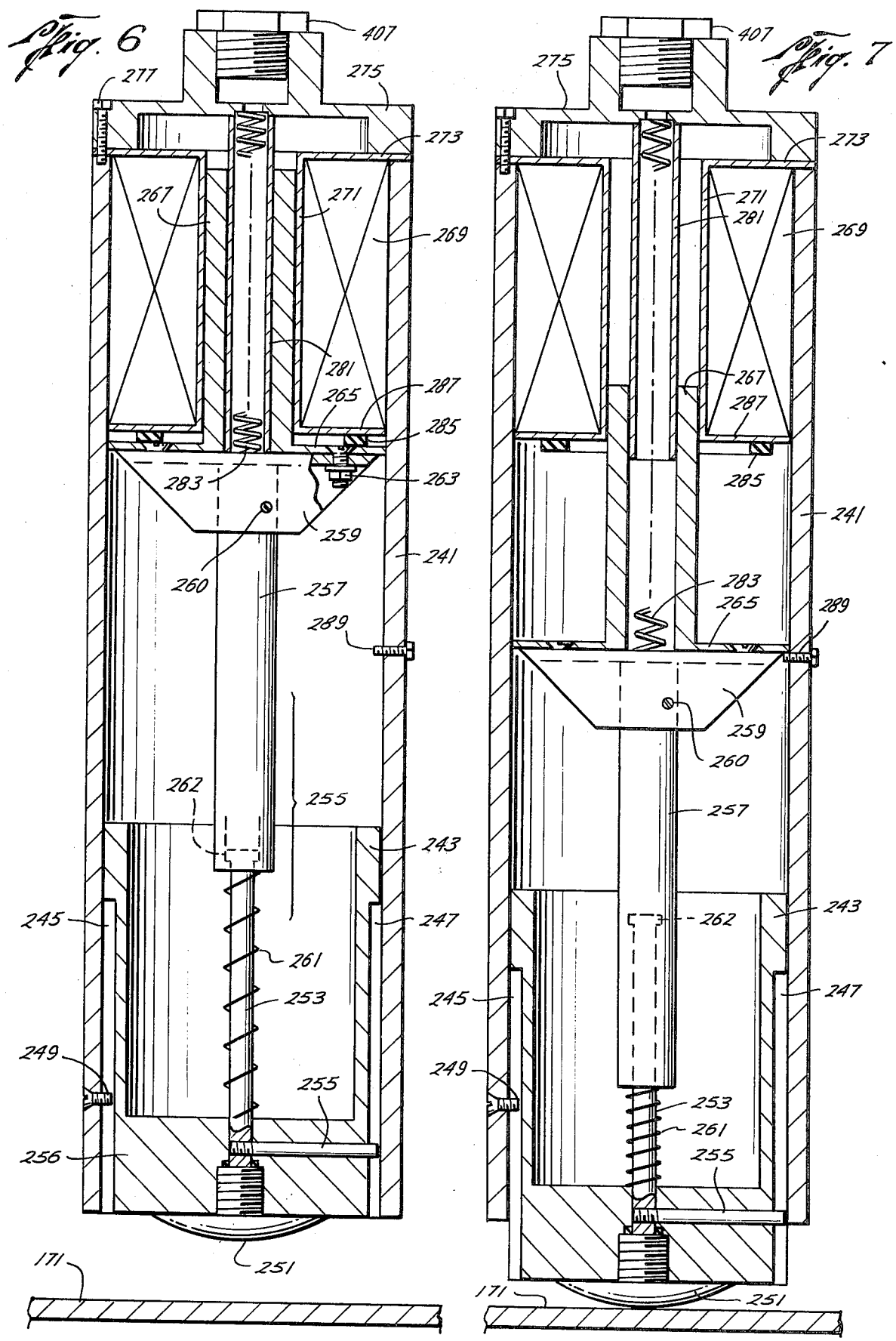

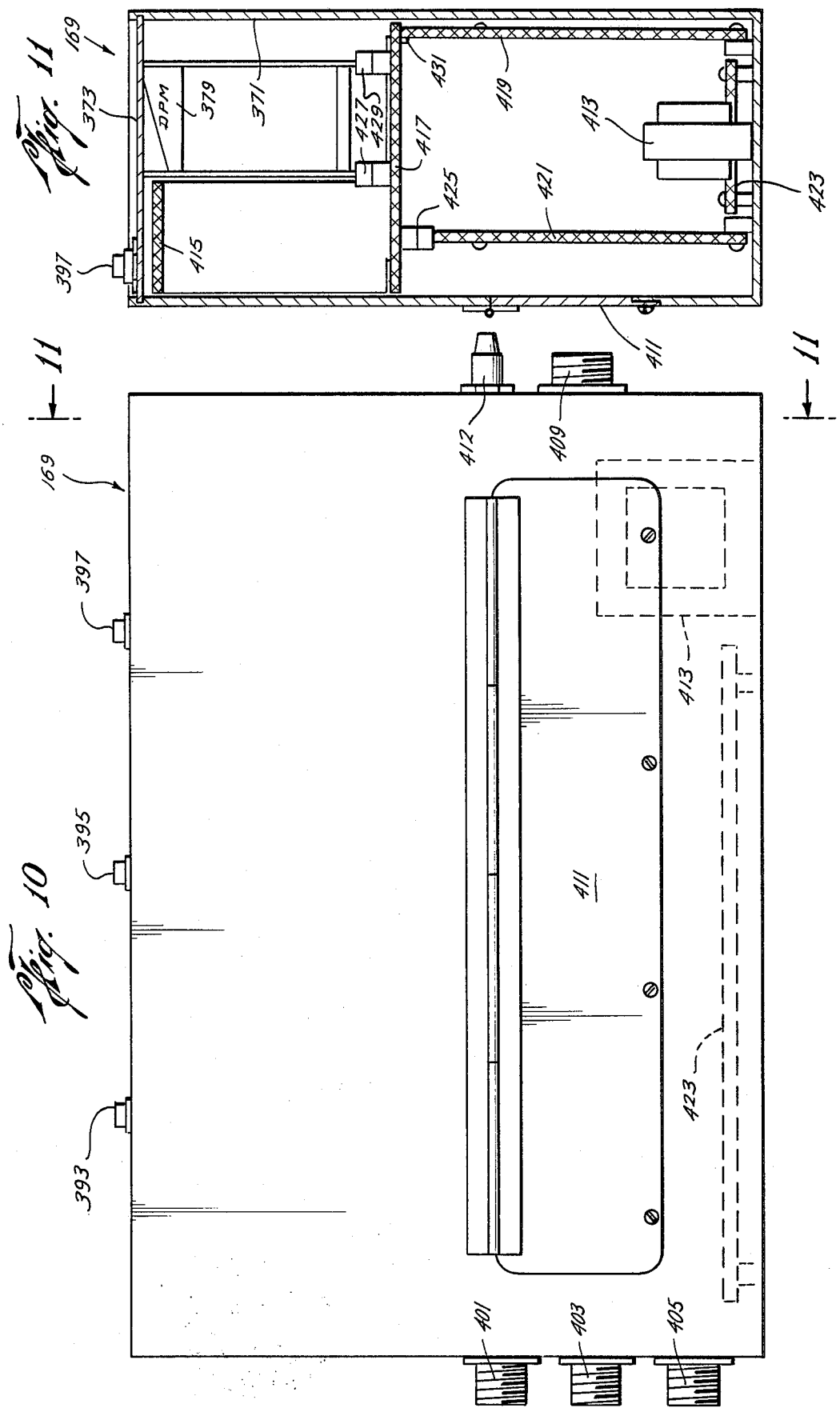

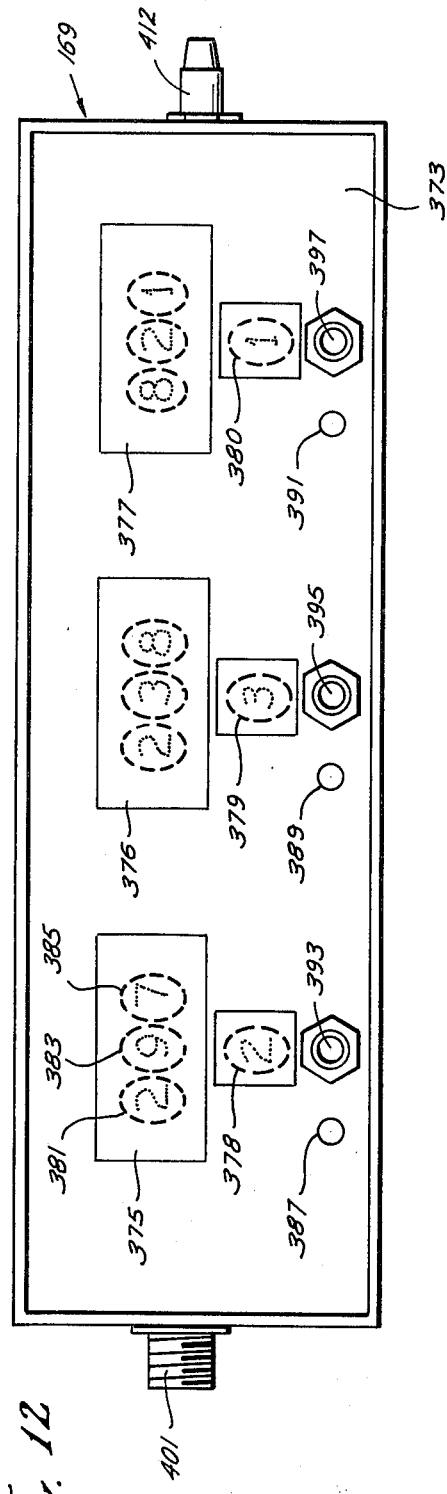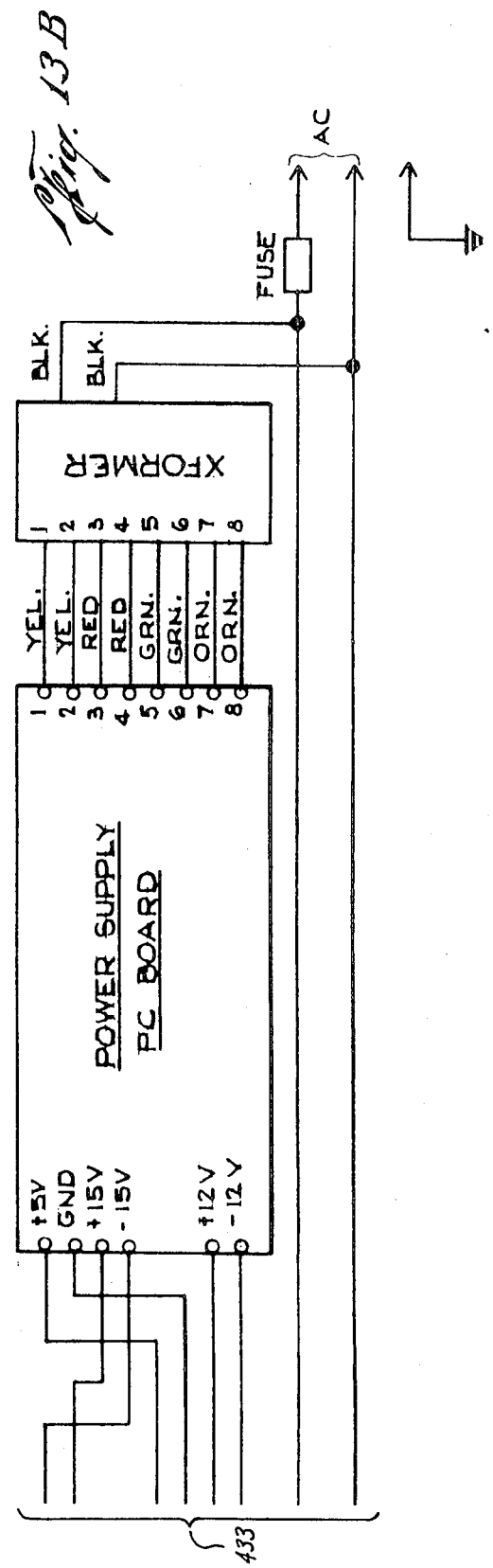

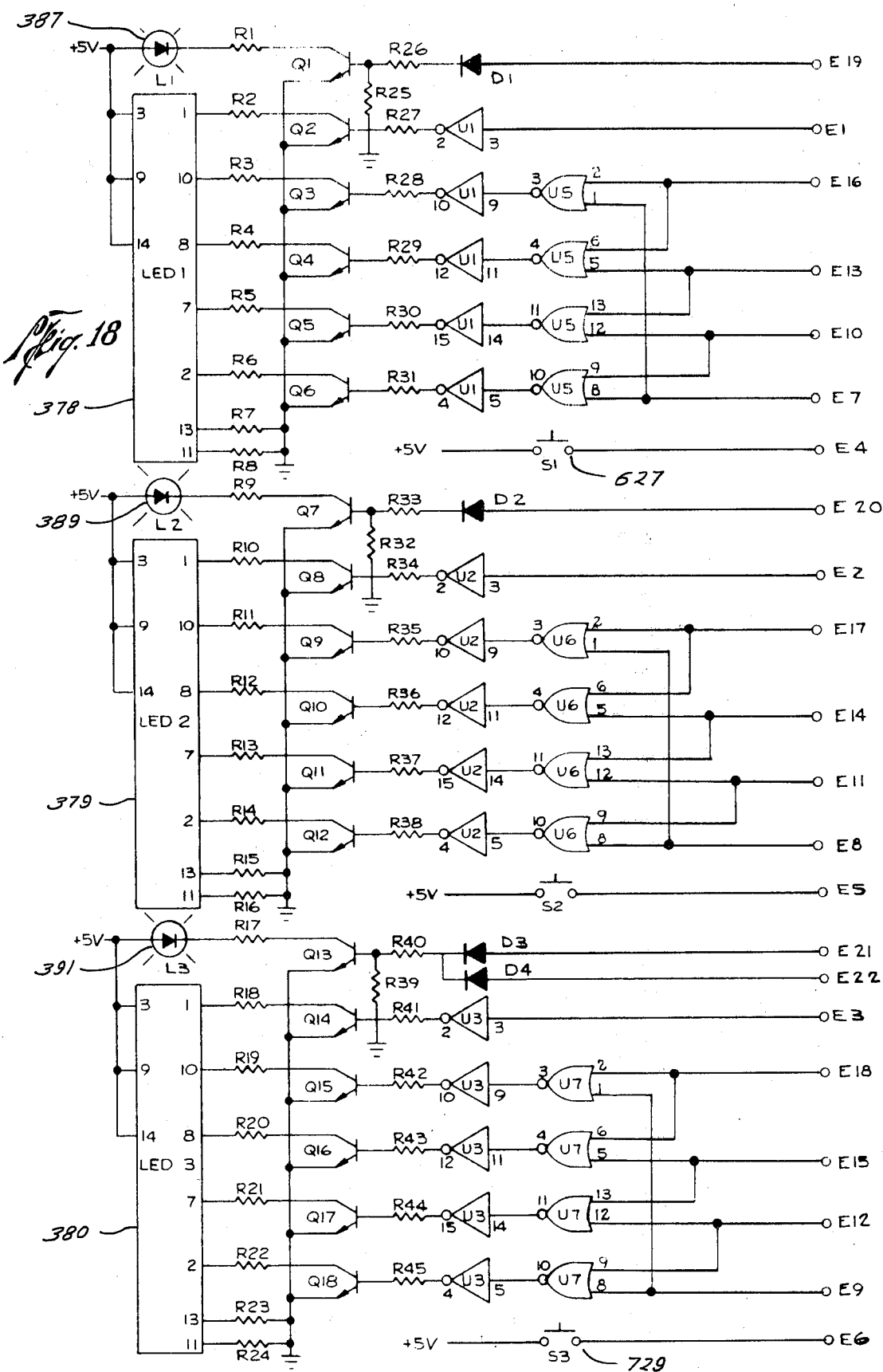

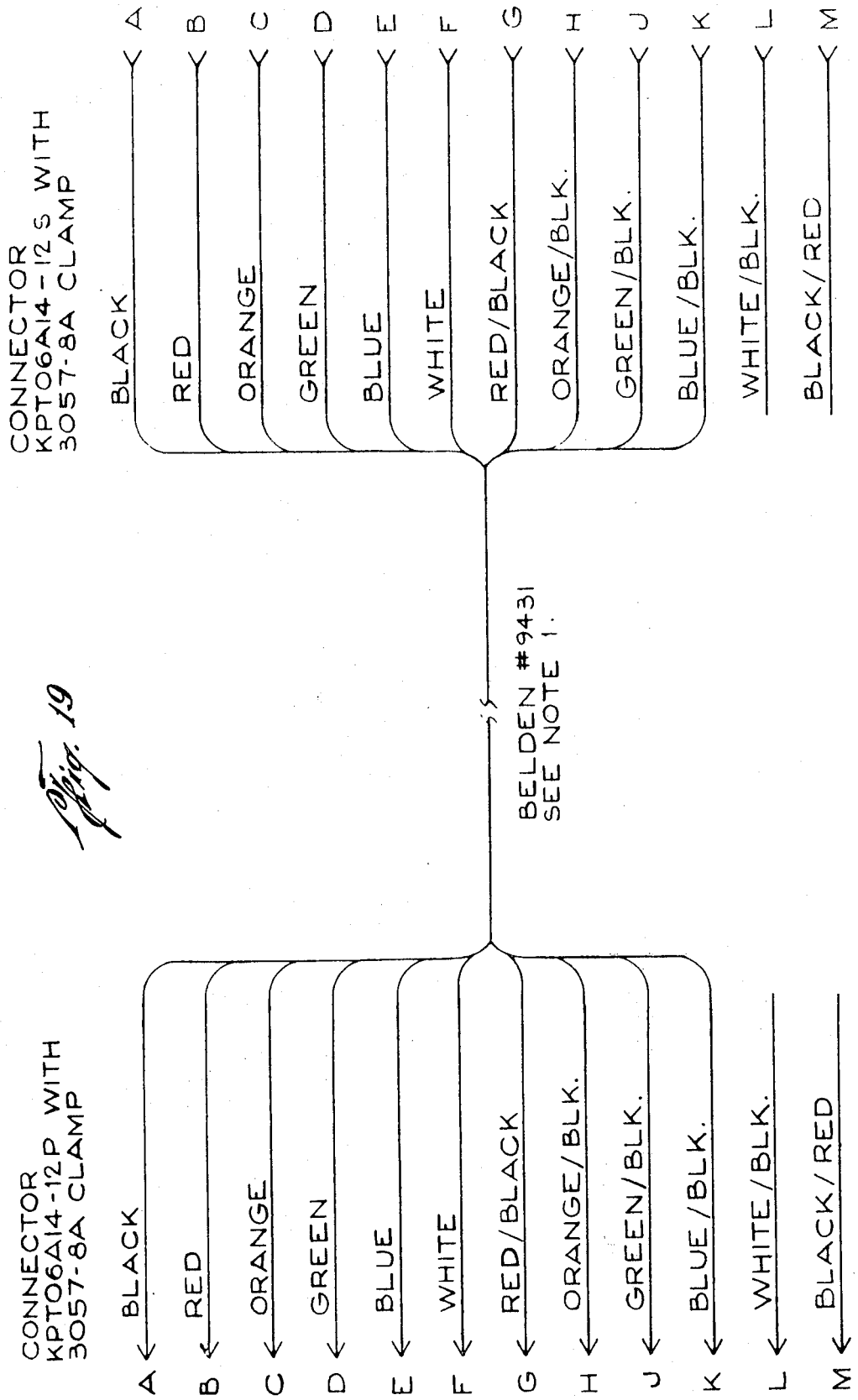

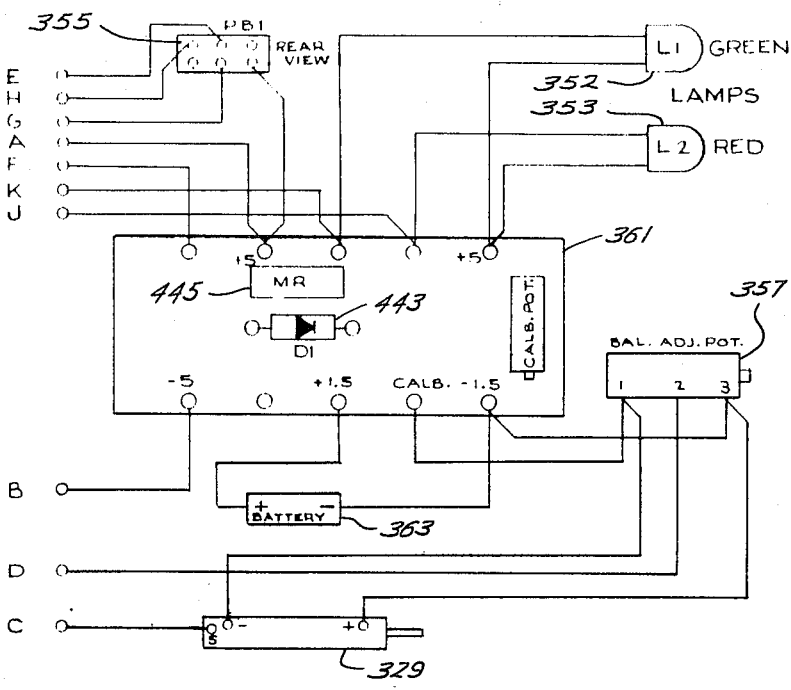
*Fig. 20A*
PICTORIAL
TO CABLE
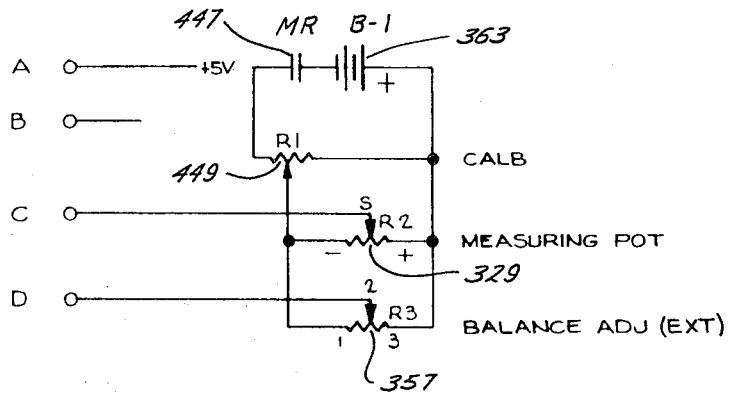
*Fig. 20B*
SCHEMATIC
TO CABLE
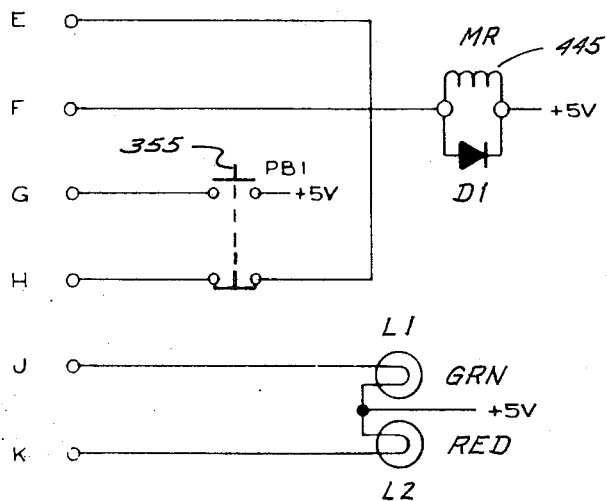

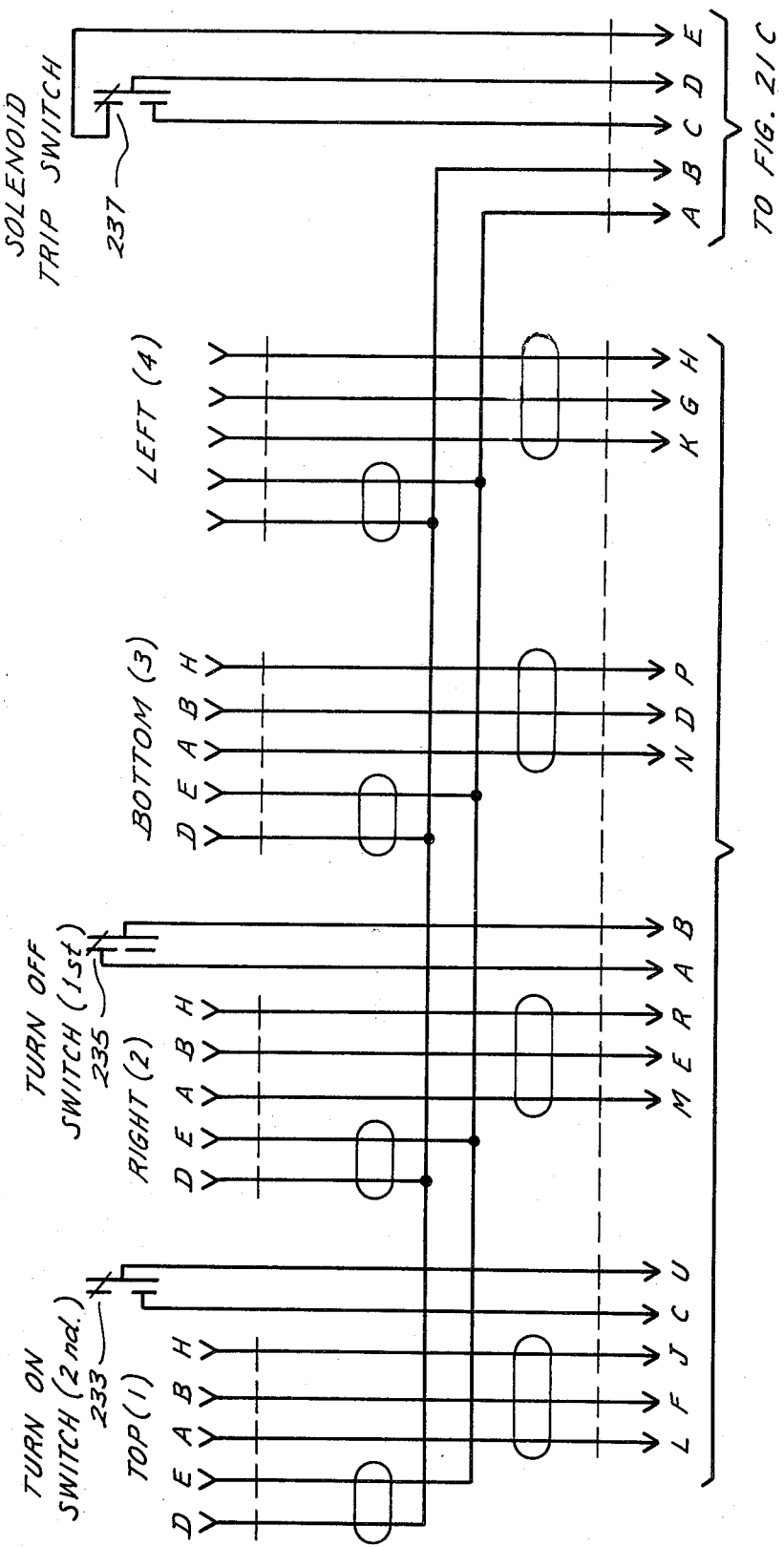

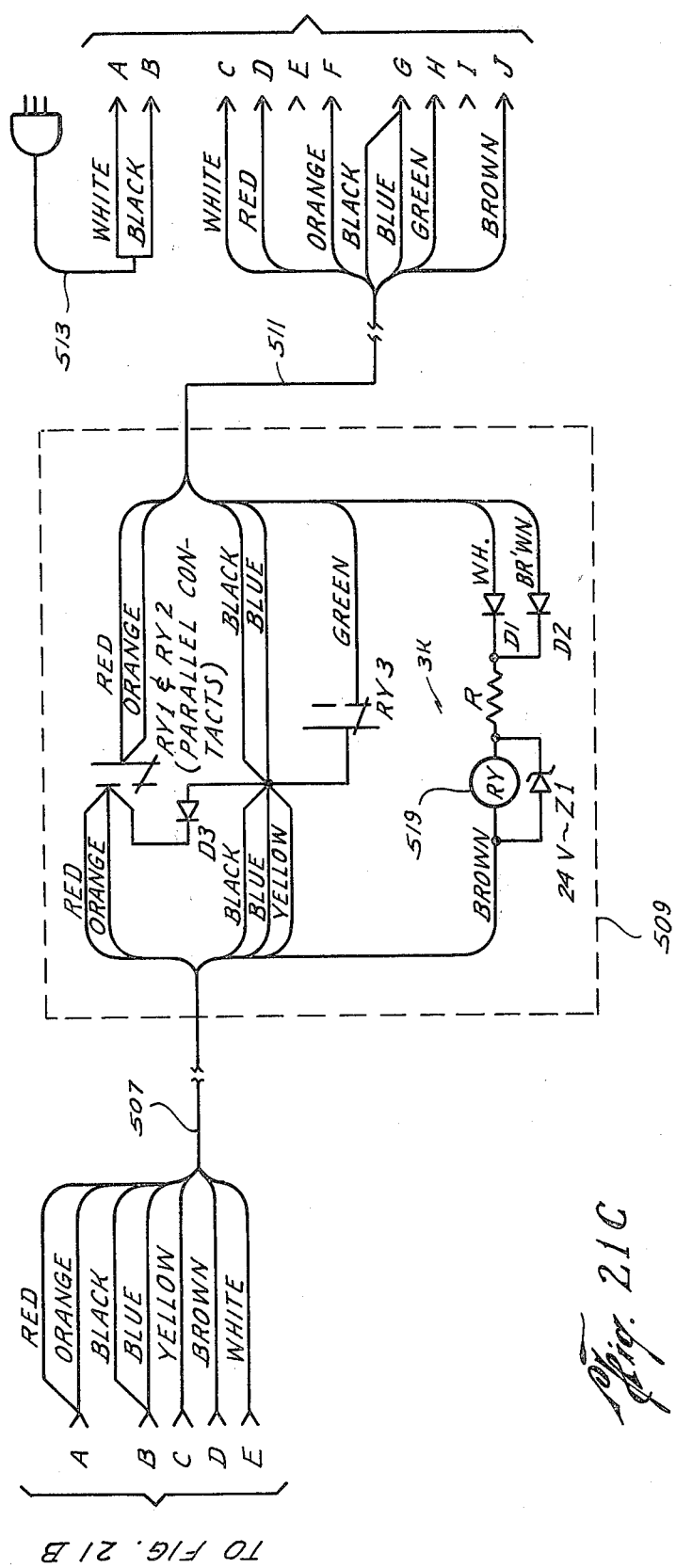

CALIPERS

BACKGROUND OF THE INVENTION a. Field of the Invention

This invention pertains to calipers and more particularly to remote indicating calipers useful especially for inspecting oil field drill pipe, including both the tube and the box and pin tool joints thereof.

b. Description of the Prior Art

A method of inspecting pipe previously known included checking for pits, cracks, and cuts in the tube, i.e., the body portion of the pipe, using magnetic flaw detection apparatus as disclosed in U.S. Pat. No. 3,539,914 issued on the application of Pruter and McClughan. Diameter of the tube and of the pin and socket tool joints at each end of the tube was measured with hand held, direct reading, calipers. For the tube calipers, a C shaped member of gage of slightly smaller than nominal tube diameter was used. Opposite ends of the gage had flat pads, one of them with a hole through it in which was mounted a spring loaded pin. If during inspection a tube was found small enough to receive this gage at all, the gage was pushed against the pipe and then was moved axially along the length of the pipe while the pipe was rotating on a chain conveyor. The pin actuated a needle moving over a scale graduated, e.g., in 1/32's of an inch. The smallest diameter reading during a pass of the gage along the length of the tube was recorded by the inspector. One or more diameter measurements on each tool joint was made with an ordinary caliper rule.

An object of the present invention is to speed up the inspection of pipe, to make the results more reliable, and to reduce the overall cost. According to the invention, like pairs of tubing calipers are mounted on the floating head of the magnetic flaw detector so that tubing calipering is effected, approximately contemporaneously with a magnetic inspection. Measurements with the calipers changes the resistance of potentiometers in opposing arms of a bridge circuit. This causes a current to flow in the bridge that is proportional to the position of the calipers. Remote indicating hand held calipers are provided for pin and box inspection.

Prior art patents relating to calipering and the like include the following U.S. Pat. Nos:

2,761,216 - Gollub
2,824,376 - Yarrow
3,140,545 - Murtland, Jr.
3,170,140 - Bruecker-Steinkuhl
2,826,818 - Roeger
3,169,323 - Hold
3,649,820 - Totsuka

Bridge Circuits

The first four above listed patents show Wheatstone bridges or potentiometers or the like used in connection with measuring instruments, the Yarrow patent relating particularly to calipering.

In the Gollub construction movement of a plunger relative to a cylinder bends a cantilever beam and compresses two strain wire resistors and stretches two others, all four attached to the beam. A bridge formed by the four is unbalanced in accordance with the extent of relative movement of the plunger and cylinder. It is to be observed that all four resistors are activated when either one of the plunger or cylinder is moved while the other is held stationary.

Yarrow discloses calipers including fixed and movable arms. Movement of the movable arm alone functions to actuate a movable contact forming one corner of a Wheatstone bridge circuit. The other arm is unconnected to the electrical circuit.

Murtland disclosed a thickness gage including three iron core reactors, the core of one of which is driven by a movable rod contacting the sheet material. Unbalance of the opposing outputs of the first and second reactors caused by movement of the movable rod drives a servo motor to adjust the third reactor to restore balance. Servomotor motion unbalances a bridge circuit which gives an indication of thickness variation.

Bruecker-Steinkuhl refers to a thickness gage whose electrical output feeds into an electrical circuit to control the thickness of the material being gaged. Details of the thickness gage are lacking.

Floating Tube Calipers

Roeger states that when his measuring tips are moved simultaneously in the same direction the generated signals balance or cancel each other out, but for generating signals his measuring tips independently of each other generate ac signals in response to movement from a given position.

Hand Calipers

The Hold patent discloses calipers adapted to be rolled along a cylindrical surface. To adapt the calipers to measuring rolls of a particular diameter the angle between the arms is such that the signal emitting means are always disposed at diametrically opposite points of the roll when the caliper is in position. The measurement is indicated by an analog type meter.

Digital Readout

Totsuka digitalizes the output of a thickness gage to enable it to be counted.

Pipe Inspection Methods

Applicants' assignee has published three brochures which illustrate and describe pipe inspection generally, entitled as follows:

"DRILCO Inspection Services International" - 1970.
"Extend the useful service life of used/abused drill pipe . . . . DRILCO-LIZE IT!" - circa 1967-70.
"Here's the DRILCO method of field inspection and maintenance for drill collars at the rig" - 12/71.

SUMMARY OF THE INVENTION

According to the invention, electrical currents proportional to the measured diameters of pipe or other cylindrical members are transmitted from a plurality of hand-held and automatic calipers to a processing console that displays a maximum departure from a predetermined nominal diameter. The invention can thus be used to classify pipe tube and pen and box tool joint diameters. The preferred embodiment of the invention also automatically displays grade indication signals according to preset ranges of departure from nominal diameters. In addition, a signalling means is provided between the hand held calipers and the processing console so the caliper operator will know when the console operator is ready to receive more information.

The automatic calipers are mounted in a floating head that also contains a magnetic flaw detector. Each of the two hand held and four automatic caliper means in the preferred embodiment of the inventions is linked to the slide of a potentiometer. The potentiometers form part of a Wheatstone Bridge circuit. Movement of the caliper moves the slide and changes the resistance of its associated potentiometer. This, in turn, causes an electric current, whose magnitude is a function of the calipers span, to flow in the bridge circuit. The automatic caliper's potentiometers are arranged in opposing balanced pairs about the pipe whose diameter is being measured. This use of balanced pairs of potentiometers compensates for lateral movements of the pipe relative to the potentiometers and insures that the calipers measure only true change in pipe diameter. The Invention is adopted to be switchable from a measuring to a calibrating mode of operation. This allows calibration of the calipers during operation to insure that the measurements obtained with them are accurate.

BRIEF DESCRIPTION OF THE DRAWING

For a detailed description of a preferred embodiment of the invention reference will now be made to the accompanying drawings wherein

FIGS. 3, 4, and 5 are views taken at the planes of FIG. 2 indicated at 3—3, 4—4, 5—5;

FIGS. 6 and 7 are sectional views of potentiometer units forming part of the tube calipering apparatus shown in FIG. 2;

FIGS. 10, 11 and 12 are front, section and top views of a console embodying the invention;

FIGS. 13A and 13B together show the interconnection of the transformer and several printed circuit boards, i.e., the power supply board, mother board, input board, display board and switch logic boards forming parts of the console;

FIG. 18 is a schematic view of the display board including the grade indicator and console signal light;

FIG. 19 is a schematic view of the type of cable that interconnects each hand caliper and the automatic calipers with the console;

FIG. 20A is a pictorial view of the electric circuits at each hand caliper;

FIG. 20B is a schematic view of the circuits of FIG. 20A;

FIGS. 21A–21E together form a schematic circuit diagram for the tubing calipers and their power supply and the connections therebetween and with the console.

DESCRIPTION OF PREFERRED EMBODIMENT

Figure 1:
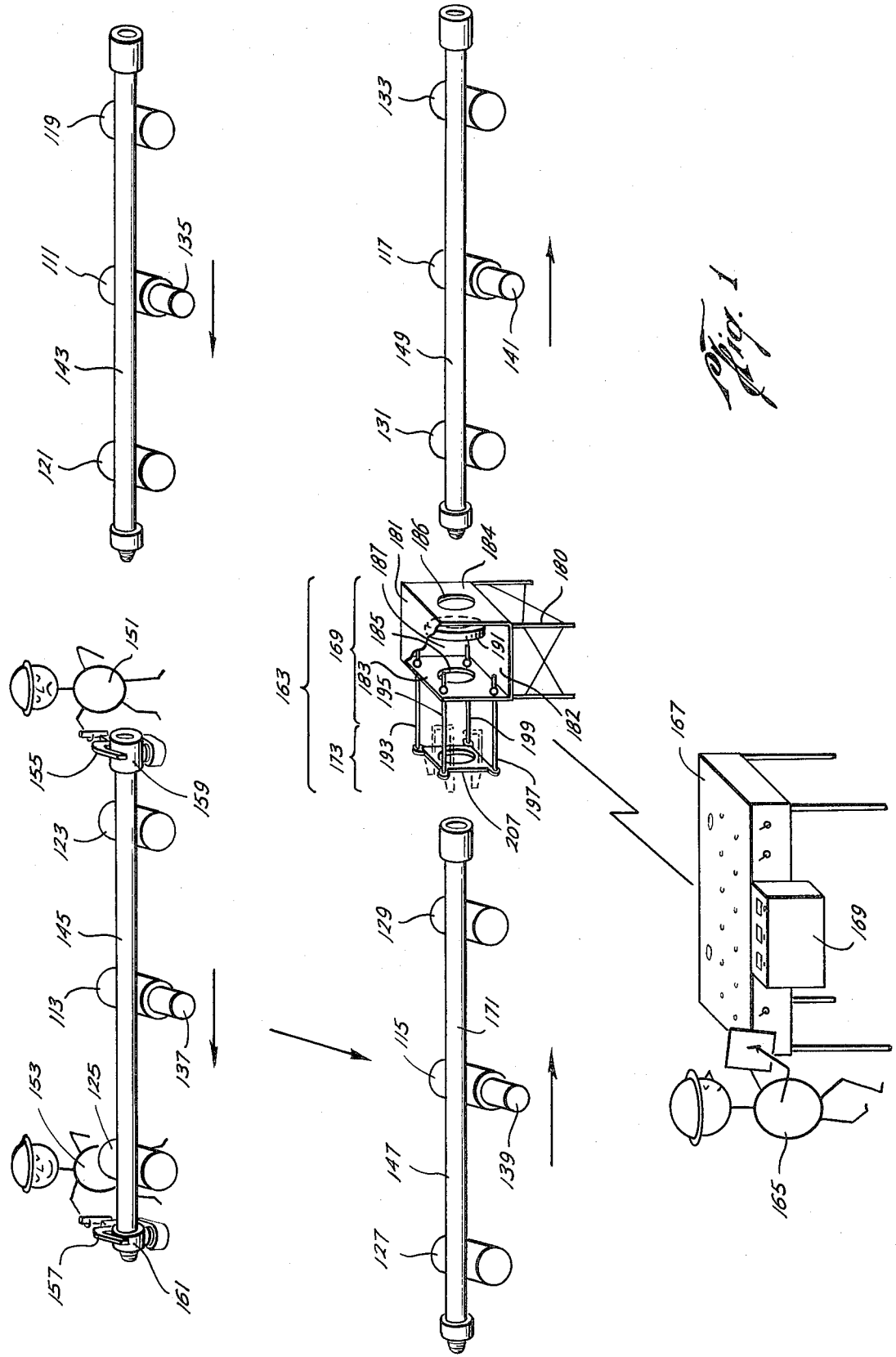
FIG. 1 is a schematic view of a pipe inspection yard utilizing apparatus according to the invention.

Referring now to FIG. 1 there is shown the general layout of a pipe inspection yard including a roller conveyor means comprising live rollers 111, 113, 115 and 117 through and idle rollers 119, 121, 123, 125, 127, 129, 131 and 133. The live rollers may be driven by electric motors through 135, 137, 139 and 141 whenever the operator desires to advance pipe, e.g. as shown at through 143, 145, 147, 149 from one part of the yard to another in the direction of the arrows. The rollers 111, 119, 121 form a pipe receiving station to receive pipe loaded off from a truck or other source. Rollers 113, 123, 125 form a joint calipering station at which the two operators 151, 153 apply hand held calipers through 155 and 157 to the box and pin tool points 159, 161. Rollers 127, 115, 129 form a machine feed station receiving pipe from the joint calipering station, e.g. via a suitable chain, gravity, or other conveyor not shown, and delivering pipe to inspection machine 163 mounted on a suitable support 180. After passing through machine 163 tthe pipe is received at the exit station comprising rollers 131, 117, 133. Operator 165 adjacent flow detection console 167 and tube calipering console 169 records the results of flaw inspection by the magnetic flaw detector 169 of machine 163, the results of calipering the tube portion 171 of the drill pipe by the automatic caliper 173 of machine 163, and the results of the hand calipering of the tool joints (of the same or a different piece of drill pipe) by operators 151, 153. Suitable cables (not shown) connect the hand calipers, the machine 169, and the consoles.

Figure 2:
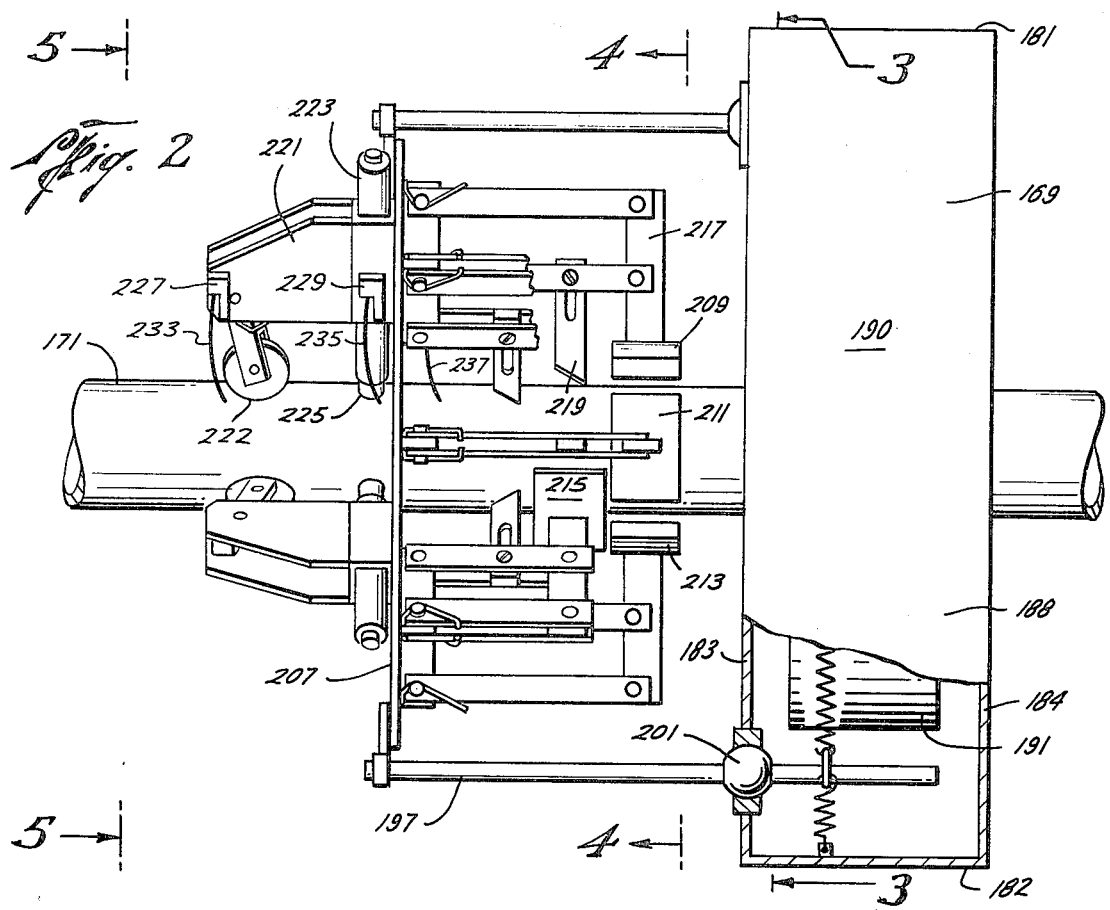
FIG. 2 is a side elevation of a prior art magnetic flaw detector, and also a tube calipering apparatus in accordance with the invention.
Figure 3:
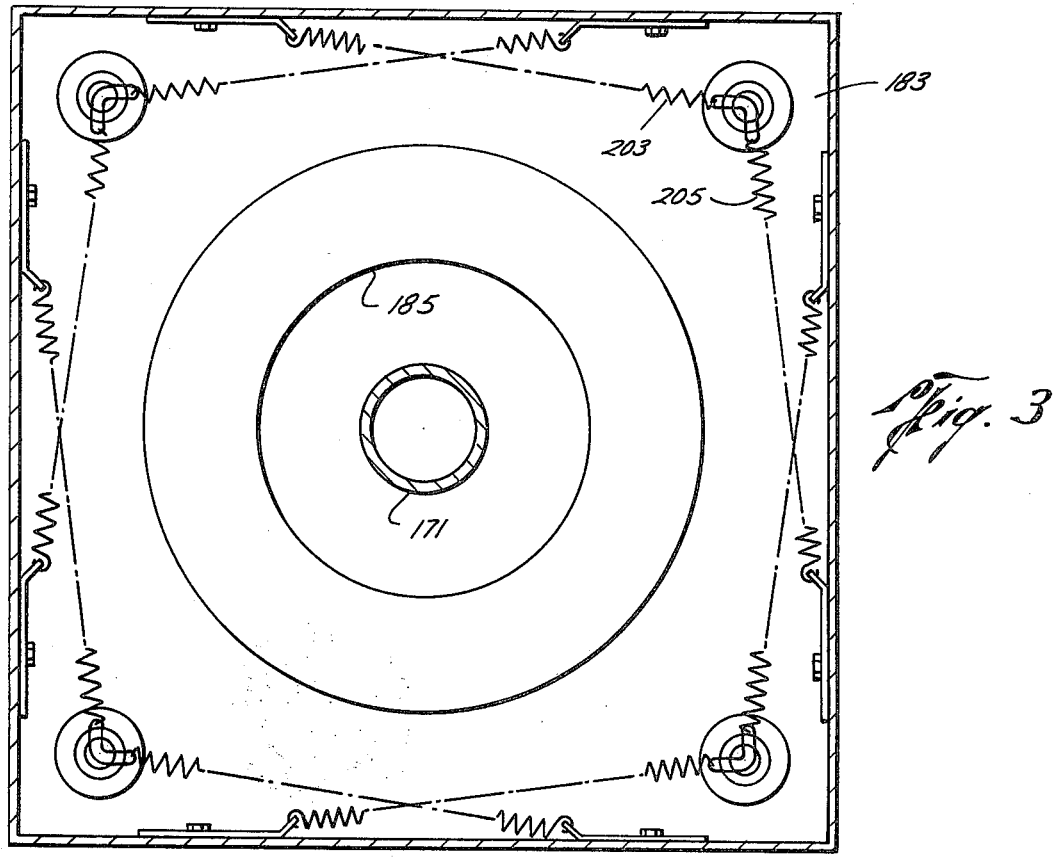
Figure 8:
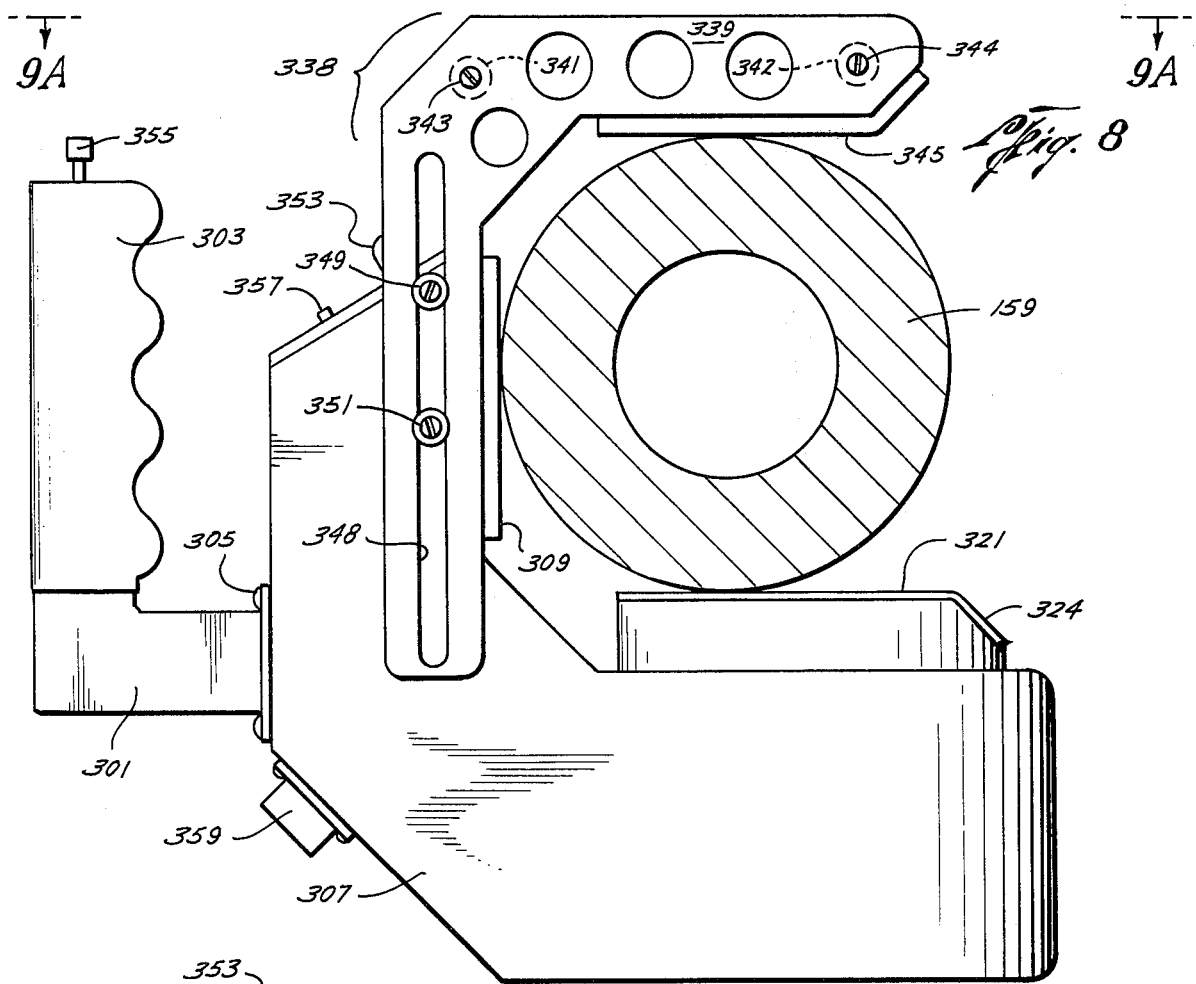
FIGS. 8, 9, 9A, 9B, are side, sectional detail, top, and front views of a hand held caliper shown pictorially in FIG. 1 and embodying the invention.
Figure 9:
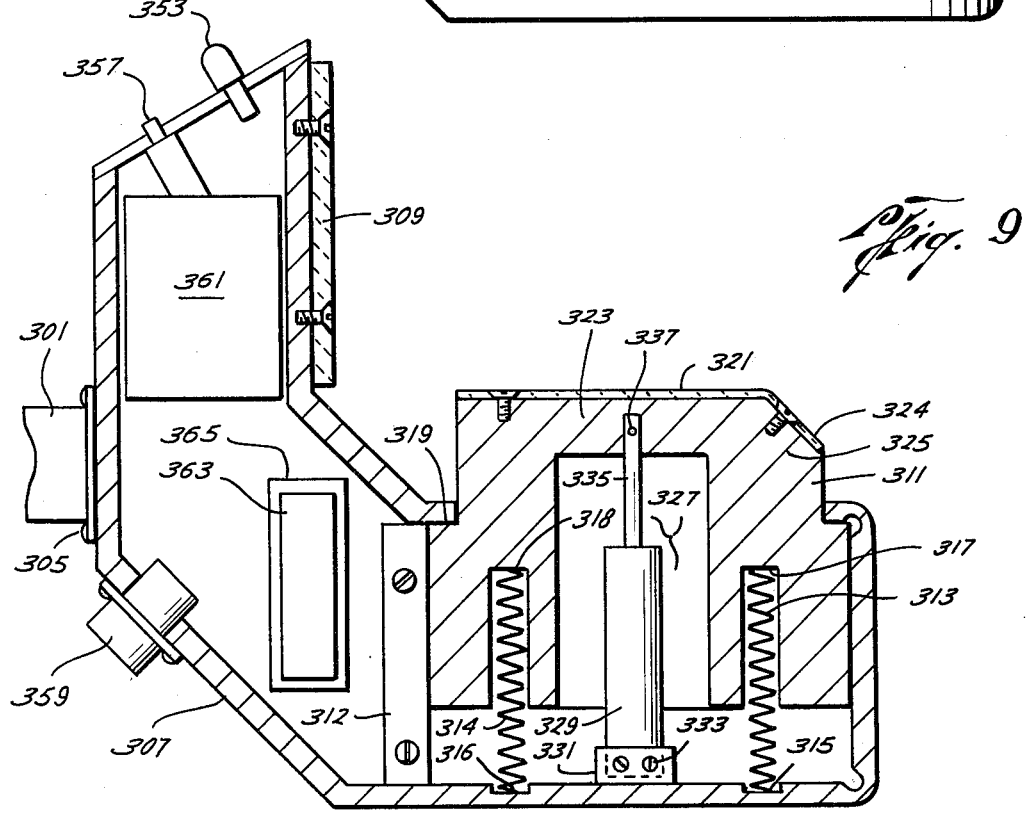
Figure 9A:
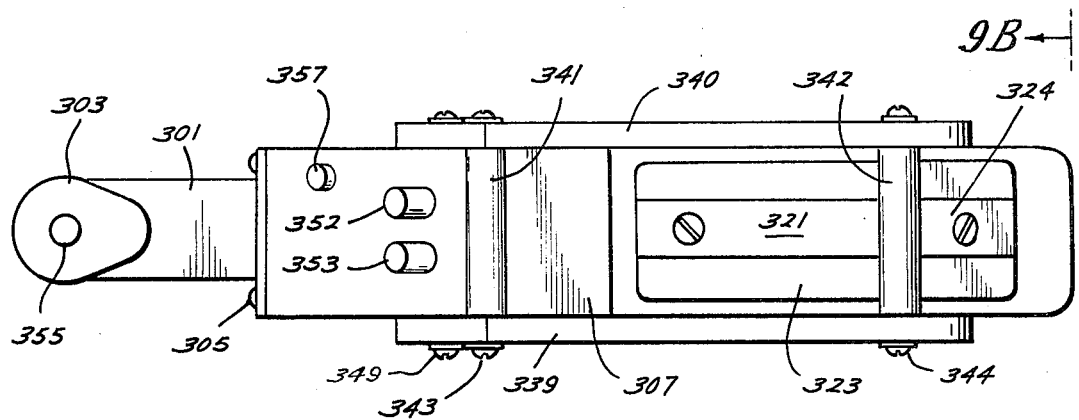
Figure 9B:
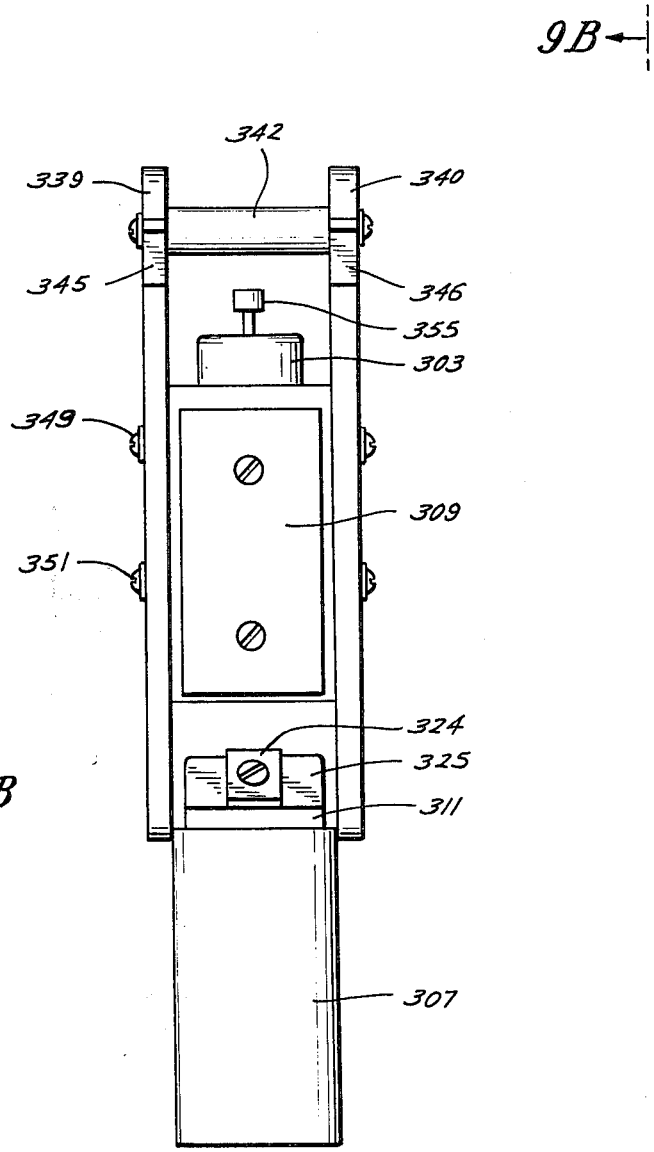

Referring more particularly to machine 163 and also to FIGS. 2 and 3, the machine includes top and base plates 181, 182 front and back plates 183, 184, which are apertured at 185, 186 to allow a pipe to pass axially therethrough, and side plates 187, 188. Within the box 190 formed by the plates 181-184, 187, 188 is housed electric solenoid 191 for magnetizing the pipe axially.

Four rods 193, 195, 197, 199 extend through ball and socket supports, e.g., as shown at 201 in apertures in front plate 183. The ends of rods 193, 195, 197, and 199 inside the box 190 are connected by tension springs, e.g. as shown at 203, 205 to the inside of the box, thereby yieldingly to hold the rods in position extending perpendicular to plate 183. At the forward ends of the rods is mounted floating support plate 207.

Referring now to FIGS. 2, 4 and 5, eight search coils, e.g., as shown at 209, 211, 213, 215 are disposed around the periphery of tube 171 in light contact therewith. These coils detect any flux leakage from the tube such as may be caused by cracks, pits, or voids. These coils are carried by eight parallelogram linkages, such as 217, each spring biased to bring the search coils into pipe contact. The linkages each carry an adjustable lifter, such as shown at 219, for moving the coils away from the tube axis when a new length of pipe enters the apparatus and the coils must pass over the load joint at the end of the pipe.

Referring now to FIGS. 2 and 5, the front side of floating support 207 carries four brackets such as 221 within each of which is mounted a guide roller such as 222. The four rollers maintain the support 207 concentric with tube 171.

The foregoing magnetic flaw detection apparatus includes console 167 to which machine 163 is connected and operates as described in the aforesaid U.S. Pat. No.

3,539,914 to Pruter and McClughan, the disclosure of which is incorporated herein by reference. The floating mounting for the search coils as just described has been in use for some time and does not per se form part of the present invention. However according to the present invention four retractable potentiometer units, 7, and as shown at 223 and in FIGS. 6 and each with a tubular movable element such as 225, are fixed mounted (e.g., welded) in the brackets (e.g., 221) so they may measure the tubes diameter in two perpendicular planes as the tube passes through the magnetic flaw detector. Three trip switches 227, 229, 231, each with an actuating lever 233, 235, 237 are fixed one on the end of each of the brackets such as 221. Switch 232 is closed when a tool joint strikes its actuating lever 237 while entering the inspection machine 163. Switch 231 connects a power supply to the electric solenoids in the calipering potentiometers. Thus when the switch closes the tube contacting elements of the calipering potentiometers are retracted by the magnetic force of the electric solenoids until the tool joint has passed, whereupon the switch opens, the solenoid is deenergized, and the tube contacting elements are resiliently urged into engagement with the tube by spring 283 of FIG. 6. The other two trip switches turn equipment on and off as will later be described. For the details of the potentiometer units reference will now be made to FIGS. 6 and 7.

Each potentiometer unit includes a tubular housing 241 within the inner end of which is axially slidably mounted a plunger 243. Longitudinal slots, such as 245, 247 are provided in the outer periphery of the plunger to be engaged by a screw 249 so as to prevent rotation of the plunger about its axis. Screwed into the lower end of the plunger is a hard headed button 251 for making contact with tube 171, as shown in FIG. 7. Rod 253, which actuates the moving contact of potentiometer 255, has its end secured in a socket in the head 256 of plunger 243 by means of a lock screw 255. Alternatively a split retaining ring may be installed in a groove provided in the end of rod 253. The case 257 of the potentiometer, which encloses the resistance portion of the potentiometer, is affixed at one end in bracket 259, e.g. by means of screw 260. A helical compression spring 261 disposed around rod 253 bears at its inner end against head 256 of plunger 243 and at its outer end against case 257. Spring 261 urges rod 153 to its fully extended position as shown in FIG. 6, limited only by stop means 262 on the end of rod 253 engaging the inturned end of case 257. Bracket 259 is fastened by bolt and nut means 263 to flange 265 on the end of tubular iron core 267. The core is axially slidable in electric solenoid 269. The solenoid is a coil wound on a spool 271 whose outermost flange 273 extends over the end of housing 241 and is secured thereto by cap 275 and screws such as shown at 277.

A tubular guide post 281, welded to cap 275, extends axially telescopically inside core 267. A helical compression spring 283 is disposed inside post 281, bearing at its outer end against cap 275 and at its inner end against bracket 259, urging the latter inwardly toward tube 171. When solenoid 269 is energized it holds core 267 in the position shown in FIG. 6 with the flange 265 against rubber stop ring 285 that is cemented to the inner flange 287 of spool 271. In this position, even though the potentiometer 255 is fully extended, the button 251 is out of contact with tube 171. When solenoid 269 is deenergized, spring 283 moves bracket 259 down until flange 265 on core 267 engages stop screw 289 in the side of housing 243. This fixes the position of potentiometer core 257 since spring 283 is stronger than spring 253. In this position, as shown in FIG. 7, button 251 is in engagement with the surface of tube 171 and the position of potentiometer rod 253 relative to potentiometer case 257 is dependent on the position of the tubes surface. The rod acts as a slide whose position determines the resistance of the potentiometer. This is well known to the art. This resistance is thus also a function of the position of the surface of the cylindrical tube. The magnitude of an electric current flowing through the potentiometer is determined by the resistance. This is true of all four potentiometers in the automatic calipers. The electric currents from each of the four potentiometers passes through associated cables to console 169 and are processed there along with similar electric currents from the hand calipers 155 and 157.

The hand calipers 157, 159 are alike and thus only one will be described. A hand caliper is shown in detail in FIGS. 8, 9, 9A, and 9B, to which reference is now made. The hand caliper includes a handle 301 with a hand grip 303. The handle is affixed by screws 305 to hollow, rectangular cross section, "L" shaped body 307. A wear pad 309 suitably secured to the inner periphery of the body provides means to position the caliper in engagement with a tool joint such as box 159. A rectangular plunger 311 is slidably mounted in body 307 for movement radially toward and away from joint 159. Guide block 312 cooperates with inner surfaces of the body 307 to guide the plunger in its movement. Helical compression springs 313, 314 urges the plunger out of body 307 and radially inwardly toward joint 159. One end of each spring 313, 314 is disposed in a recess, as at 315, 316, in body 307. The other ends of springs 313, 314 are received in recesses 317, 318 in the plunger and bear against the plunger. Movement of the plunger out of the body 307 is limited by shoulder 319 on the plunger engaging the inner surface of the body. Plunger 311 is provided with a gage plate means 321 on its pipe adjacent head 323, such means preferably comprising a strip of hard metal screwed to the head. The means 321 preferably extends down at 324 over bevel 325 on plunger 311 which is provided to guide the caliper into position adjacent joint 159.

Within body 307 is mounted potentiometer 327. The body 329 of the potentiometer, which houses the resistance element, is affixed in caliper body 307 by means of cup 331 welded to the caliper body, the cup receiving potentiometer body 329 and screws 333 holding it in place. Rod 335 which carries the movable contact, or slide, of the potentiometer, is secured by pin 337 to head 323 of plunger 311.

An adjustable gage 338 comprises two L-shaped plates 339, 340 interconnected by spacer tubes 341, 342 and screws 343, 344. Plates 345, 346 are affixed to the inner edges of the plates 339, 340, that is, the edges nearest tube 159. The plates 339, 340 are spaced apart so as to fit over the outside of body 307. The plates are slotted at 348 and receive screws 349, 351 by means of which the gage is adjustably secured to caliper body 307.

Slot 348 is at right angles to plate 345, and the line connecting the centers of screws 349, 351 is parallel to plate 309, so that the planes of plates 309, 345 are at right angles to each other in all positions of adjustment of the gage relation to the caliper body. Gage plate means 321 is in a plane at right angles to the plane of plate 309, so that means 321 and plate 345 are parallel and thus contact tube 159 at diametrically opposite sides of the tube. With plates 309 and 345 in contact with tube 159, the distance from them to the top of plate means 321 is a measure of the joint diameter. The position of plate 321 is a function of the electric current flowing through its associated potentiometer 327 as described above and this current is conducted via cable to console 169 for further processing.

The electric circuit means interconnecting the two hand calipers 155, 157 and the automatic caliper 173 with console 169 and included in console 169 in the preferred embodiment of the invention performs several functions as follows:

1. maximum departure of tube and joint diameters from nominal are, at the console, displayed digitally in thousands of thirty-secondths (0.001 × 1/32) of an inch.
2. departures from nominal diameters within a plurality of different pre-determined ranges cause different grade indicator signals to be displayed at the console.
3. the console attendant can, by pushing a reset button on the console, clear the console of prior information received from each hand caliper simultaneously turning on a green light at the respective hand caliper to signal the caliper operator that the console is ready to receive additional information. Further, a red light is turned on at the hand when the caliper is turned off.
4. each hand caliper operator can, by pushing a button on the hand caliper, place his caliper in condition to transmit information, in the form of electric currents, to the console. Release of this button turns on a signal light at the console. Such release also locks in the digital display at the console, causing it to continue to display its last reading so the console operator can record it, and turns on a red light at the caliper to warn the caliper operator he cannot transmit any information. The green light is turned off during this operation until reset by the console operator.

The mechanical disposition of this circuit means will next be described.

Referring again to FIGS. 8, 9, 9A and 9B, mounted on the upper end of each caliper body 307 are two signal lights 352, 353, one green, one red. When the green light 352 is on it indicates to the hand caliper operator that the console 169 is in condition to receive new information. The hand caliper operator can then proceed to apply his caliper to the tool joint and rotate it about the joint axis 360° to obtain diameter measurements all around the joint, and possibly repeat the operation at intervals along the length of the joint, or move the caliper axially and circumferentially at the same time to obtain a sampling of diameters at different places. During this operation the operator holds spring-loaded, normally-off, switch button 355 depressed to effect transmission of information to the console, and when the calipering operation is completed the button is released prior to removing the calipers from the tool joint, thereby to signal the console attendant that the operation has been completed and that he should record the data. This also causes the red light 353 to be lit and causes the console displays to be fixed. This is the hold condition in which the console takes no further information from the particular hand caliper. When the console operator is through recording he signals the hand caliper operator by pressing his reset button which turns on the green light and turns off the red light at the hand caliper, clears the console and places it in condition to receive more information and turns off the console signal light.

On the body 307 of the caliper near the lights, 352, 353, is mounted a potentiometer 357, which is accessible from the outside for adjustment of the balance of the electrical current. The connection for the cable, not shown, which connects the hand caliper with the console, is made at connector 359. A printed circuit board 361, shown diagramatically in FIG. 20A and schematically in FIG. 20B, is provided in the body of the hand caliper. This includes means for processing the signals generated and received by the hand caliper. A battery 363 in holder 365 provides a local power supply.

Referring now to FIGS. 10, 11 and 12, the console 169 comprises a box shaped housing 371. The top of the housing is formed by a transparent panel 373. Beneath the panel are mounted three display means in the form of three DPMs (digital panel meters) 375, 376, 377 for indicating maximum departure from nominal of tube, box, and pin diameter. These display means are well known to those skilled in the art and may each comprise a group of three character display tubes such as 381, 383, 385. These tubes may be of the kind known as Nixie tubes. See U.S. Pat. Nos. 2,833,949, 2,848,638, 2,878,407, 2,964,672, 3,041,491, 3,127,535, 3,144,578 for disclosures of various character display tubes. The three DPMs also include circuitry means for converting analog signals to digital readouts (A/D converters) having binary coded decimal (BCD) outputs that comprise the input to logic circuits of the grade indicator display means, infra. These DPMs may, for example, be Model 2532-1B-1-RX-CX-A, made by Analogic, of Wakefield, Mass.

Three more digital display means 378, 379, 380, each comprise a single LED (light emitting diode) readout or other character display. These are connected to the output of the grade indicator logic circuits and display a number e.g., 1, 2, 3, representing the grade, or departure from a present standard, of the pipe being calipered. box or tube is concerned. Also located on top of panel 373 are three indicator lights 387, 389, 391, each of which signals the console attendant when lit that only calibrating signals for the pin, box or tube corresponding to the particular light, are being received and that the data displayed should not be recorded. Reset switches 393, 395, 397 on the top of the panel provide means for the console attendant to reset the console logic and clear each of the digital display means 375, 377, 379 to receive a new set of information as to pin, box, and tube diameters and. Also, in the case of the pin and box measurements, resetting the console logic signals the hand caliper operator via the green light discussed above, that the console has been cleared and is ready to receive further information.

At one side of housing 371 are connectors 401, 403, 405 to which three cables, not shown, are connected, two of the cables leading to connectors 359 on the hand calipers (see FIGS. 8 and 9) and the remaining cable leading to automatic caliper 173 where it divides and connects to the four potentiometer units through connectors such as 407 (see FIGS. 6 and 7).

At the opposite side of console housing 371 is a connector 409 for a power supply cable (not shown). A hinged cover 411 provides access to the interior of the console. A fuse 412 is accessible at the side of the housing.

Figure 13A:
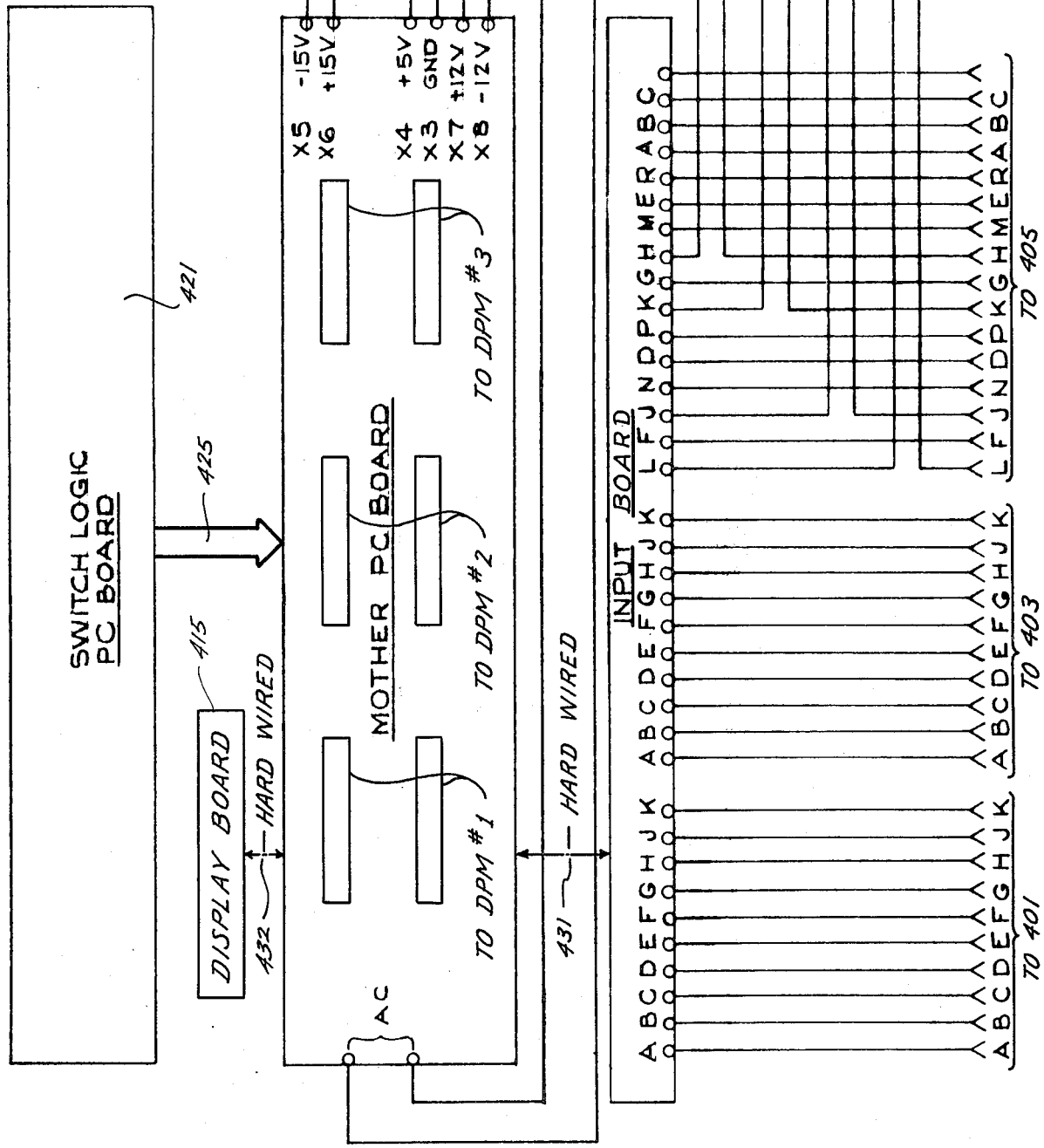

Referring now particularly to FIG. 11, within housing 371 there are mounted a step down transformer 413, and a plurality of printed circuit boards designed respectively as: display board 415, which is the display means of the preferred embodiment of the invention and is schematically illustrated in FIG. 18 below; mother board 417, which supplies physical support and electrical interconnection for the other electronic elements of the preferred embodiment of the invention; input board 419, which provides the console electronics with a centralized interface with the other electronic parts of the preferred embodiment; switch logic board 421, which is described by FIGS. 14A, 14B and 14C; and power supply board 423 which is fully illustrated in FIG. 17. As indicated in FIG. 13A, the switch logic board plugs directly into the underside of mother board, such connection being indicated at 425 in FIG. 11. The display board 415 and the three digital panel meters, such as 379, are plugged directly into the top side of the mother board, as indicated at 427, 429. The input board is hard wired to the mother board at 431 and as shown in FIG. 13A, and the power supply board is also hard wired to the mother board and transformer as shown in FIG. 13B, FIG. 13B being a continuation from the six conductors 433 of FIG. 13A. The display board is also hard wired to the mother board as indicated at 432 in FIG. 13A.

Figure 14A:
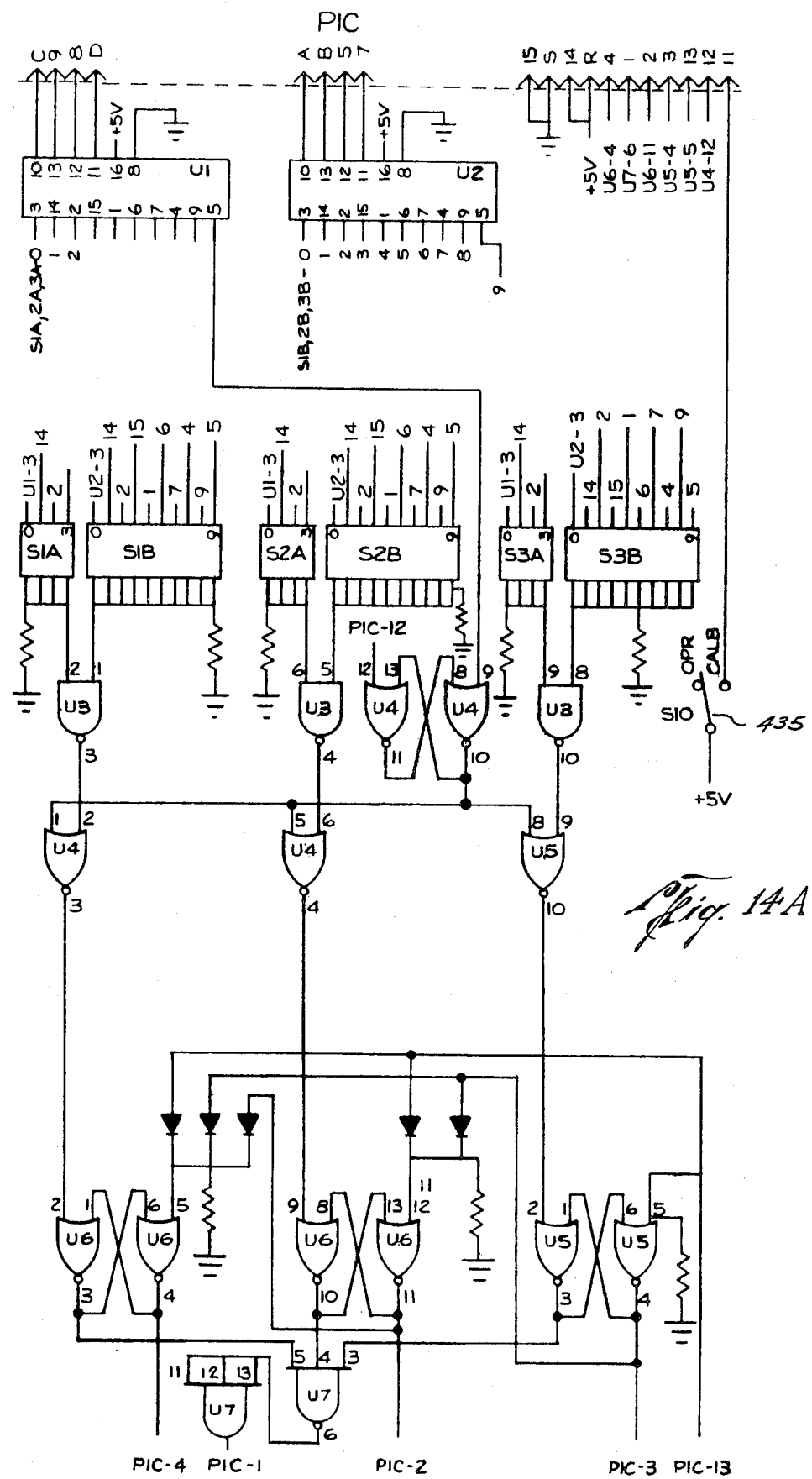
FIGS. 14A, 14B and 14C together form a schematic view of the switch logic board.
Figure 14B:
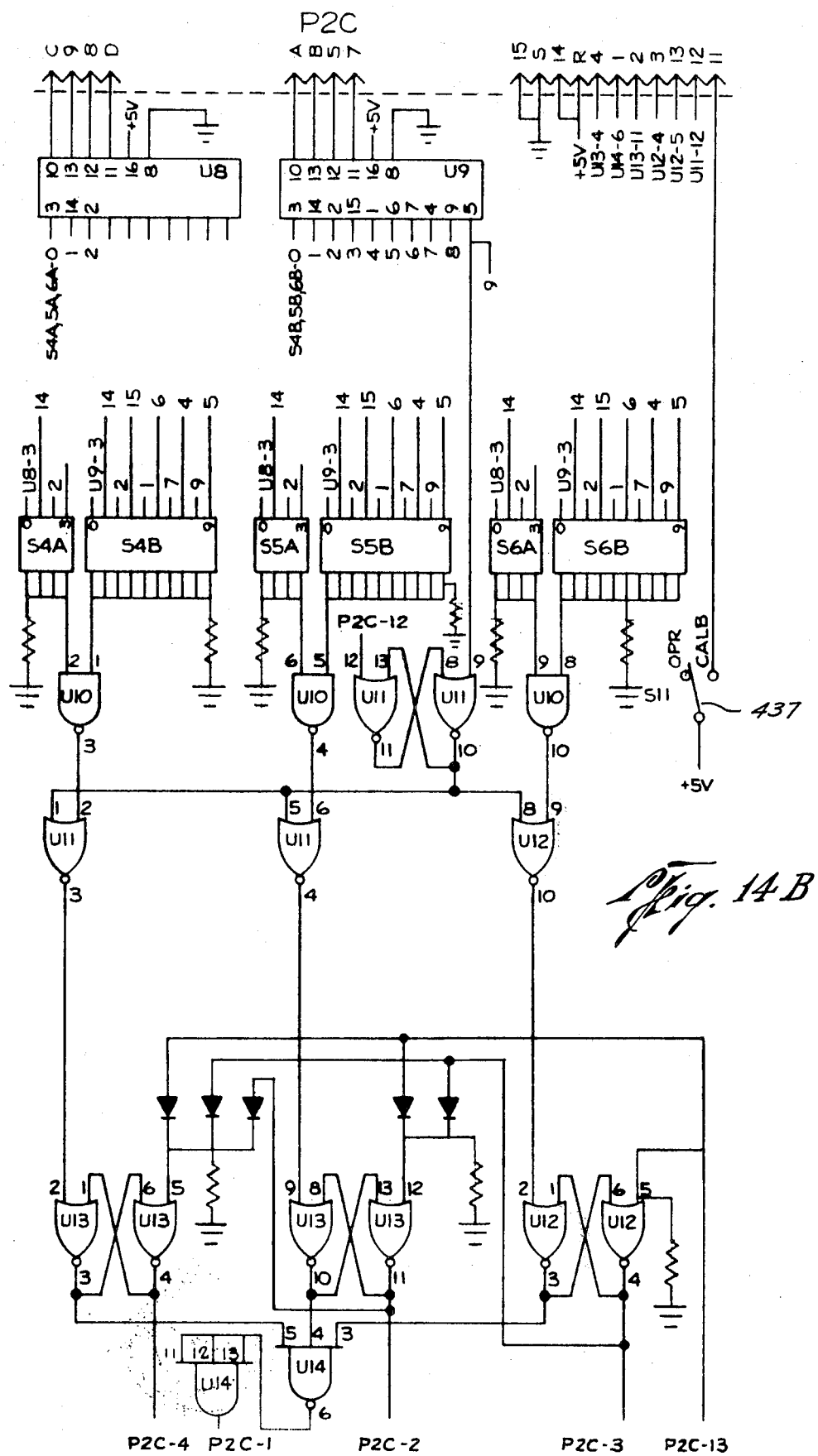
Figure 14C:
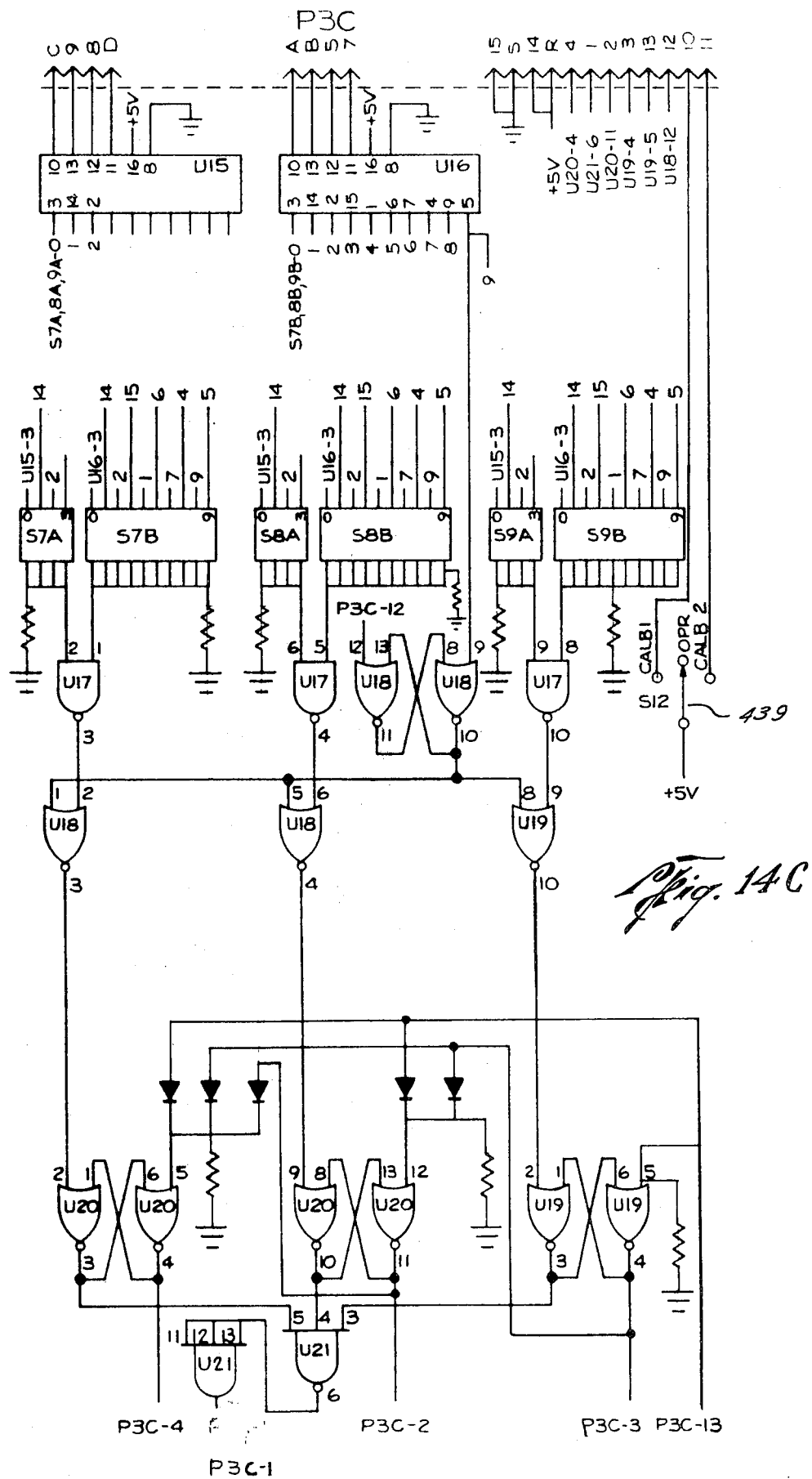

FIGS. 14A, 14B, and 14C are schematic drawings of the switch logic board. All of the components used in the preferred embodiment of thy invention are old and well known to those with skill in the art. In the preferred embodiment of the invention these old parts are combined in a new way to yield a new result. Functionally, the cooperation of the parts of the preferred embodiment of the invention will be readily understood by those workers with even moderate skill in the electronic arts. Thus these functions are best described by detailed parts lists and schematic drawings incorporated into this disclosure.

These allow anybody who can read a schematic diagram to build and use the preferred embodiment of the invention. The inventor will thus be spared the task of tracing every current flowing in each step of every operation, but rather will give a broad description depending on the ordinary skill of the ordinary worker and the complete schematic and parts disclosure for detail. The interiorly terminating conductors marked with numbers or letter/numbers connect to other terminated conductors of like marking, this drafting idiom eliminating the need for a maze of overlapping lines. By throwing switches 435, 437, 439, the apparatus can be shifted from an operating mode to a calibration mode of circuitry. The switch logic board includes the two like tool joint portions of FIGS. 14A and 14B and the tube portion of FIG. 14C. The components of the several circuits are set forth in the following charts. In this and other charts hereinafter IC means integrated circuit, and RCA, AMP, and ALCO etc. refer to the component manufacturers using such trade names and the part numbers are those of the manufacturers supplying such component, the components being further identified in the suppliers published literature available to the industry.

SWITCH LOGIC P.C. BOARD

| ITEM | CODE | QTY. | DESCRIPTION | MANUFACTURER AND PART NO. |
|---|---|---|---|---|
| 1 | U1,U2,U8,U9, U15,U16 | 6 | I.C. | RCA CD4028AE RCA Part No. AE See COSMOS Catalog |
| 2 | U3,U10,U17 | 3 | I.C. | RCA CD4011AE |
| 3 | U4,U5,U6,U11 U12,U13,U18, U19,U20 | 9 | I.C. | RCA CD4001AE |
| 4 | U7,U14,U21 | 3 | I.C. | AMP435166-2 |
| 5 | S1A,S2A,S3A, S4A,S5A,S6A, S7A,S8A,S9A | 9 | SWITCH | RCA CD 40023AE |
| 6 | S1B,S2B,S3B, S4B,S5B,S6B, S7B,S8B,S9B | 9 | SWITCH | AMP 435166-7 |
| 7 | S10,S11,S12 | 3 | SWITCH | ALCO MST-105D |

Figure 15A:
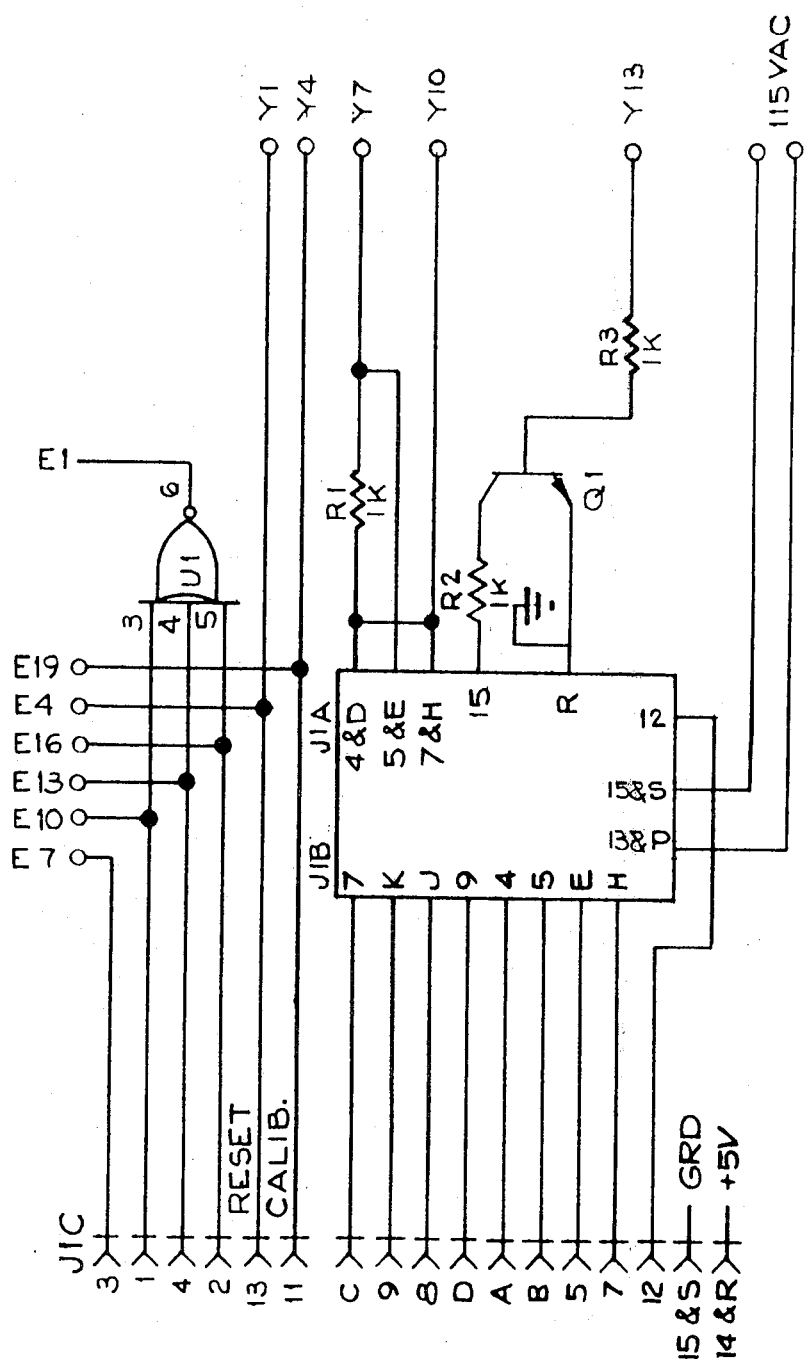
FIGS. 15A, 15B and, 15C together form a schematic view of the mother board.
Figure 15B:
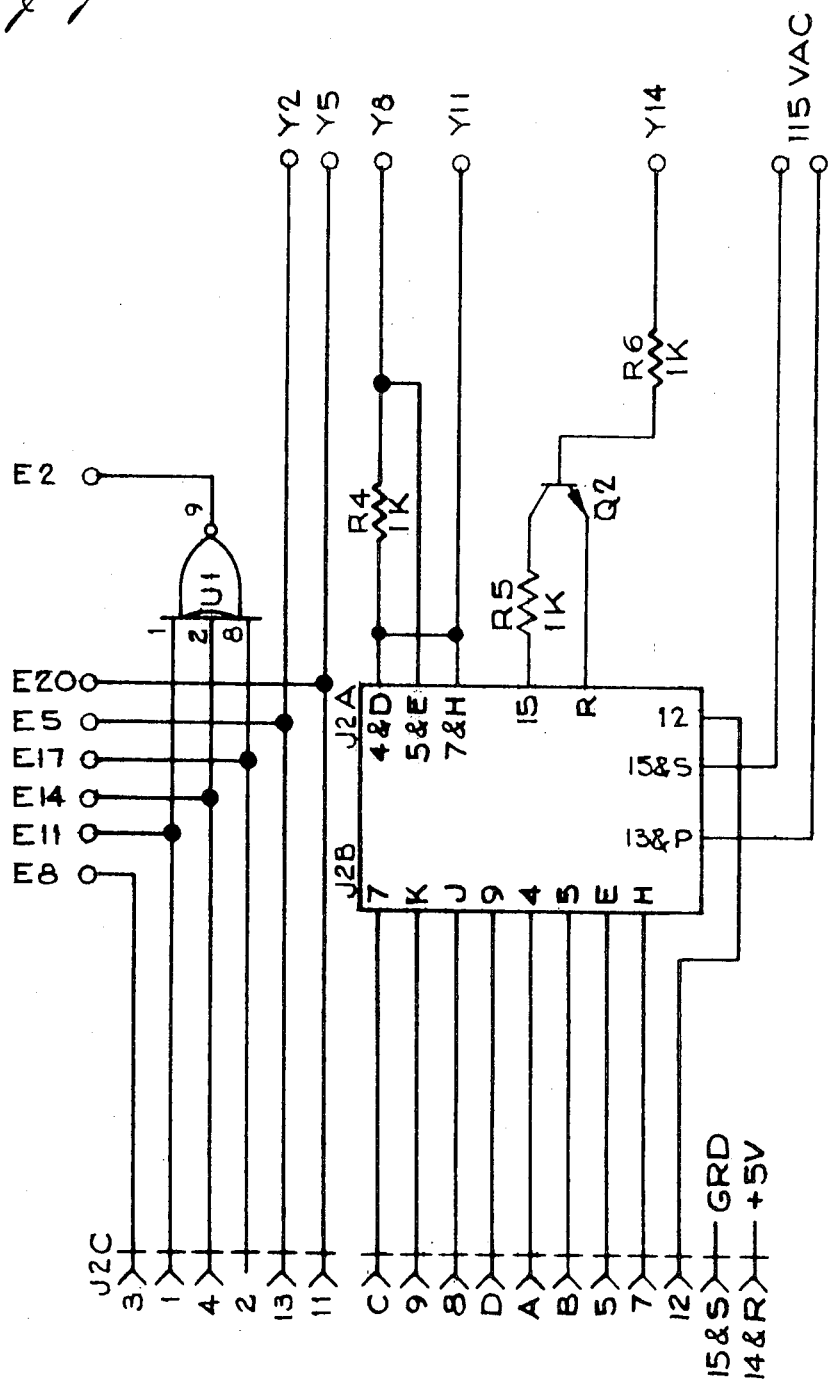
Figure 15C:
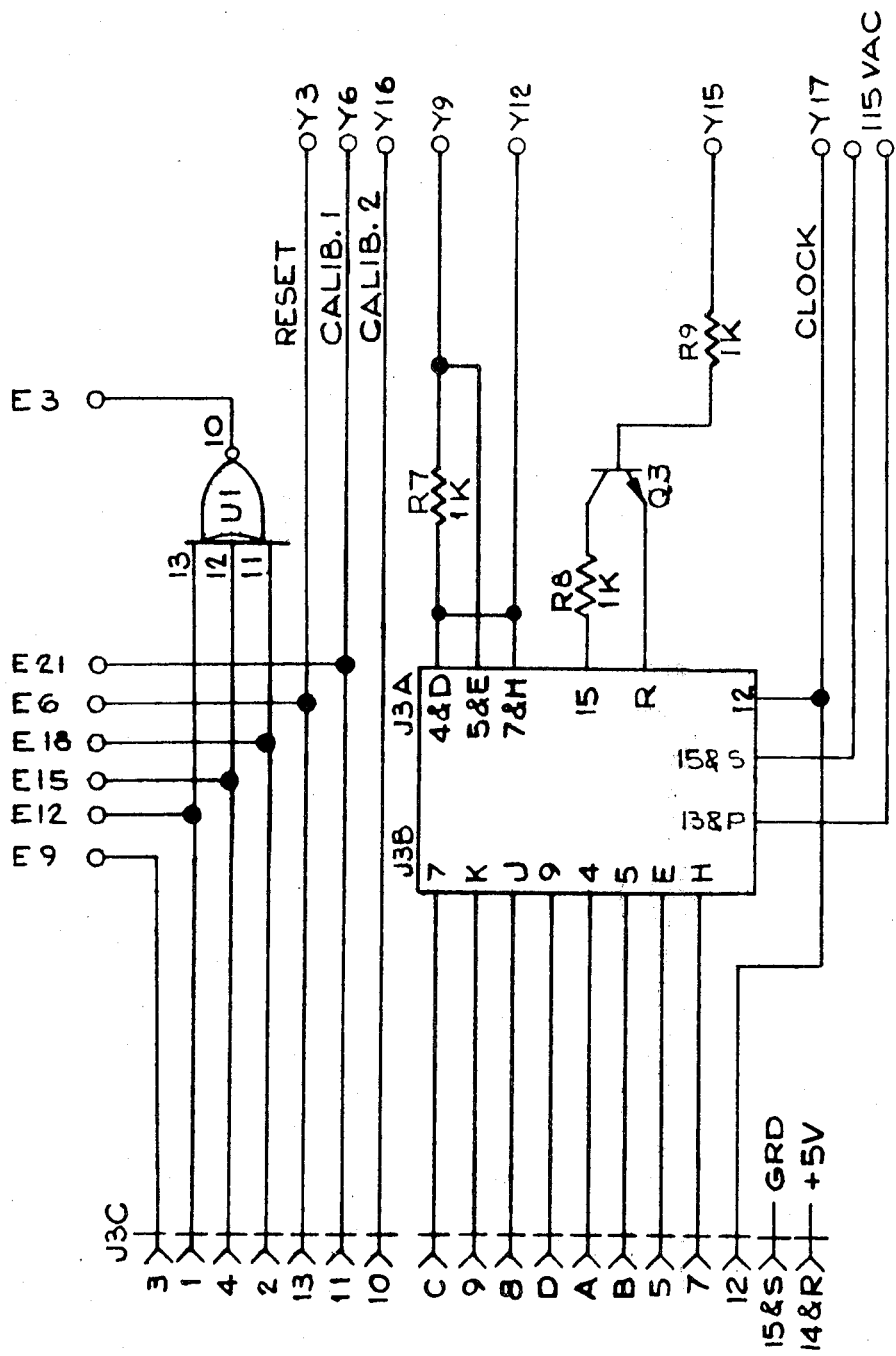

FIGS. 15A, 15B, and 15C show schematically the portion of the Mother Board that functions during the pin and box tool joint calipering and tube calipering operations. The particular components used by the preferred embodiment of the invention for this function are set forth in the following chart.

MOTHER BOARD

| ITEM | CODE | QTY. | DESCRIPTION | MANUFACTURER AND PART NO. |
|---|---|---|---|---|
| 1 | R1 – R9 | 9 | Resistor 1K, ¼ W, 5% | |
| 2 | Q1 – Q3 | 3 | Transistors | Motorola MPS 2925 |
| 3 | U1 | 1 | I.C. | CD4025AE |
| 4 | J1B – J3B | 3 | Connector, P.C. 30 Pin | CINCH 50-30-B-10 |
| 5 | J1C – J3C | 3 | Connector, P.C. 30 Pin | CINCH 50-30-B-10 |
| 6 | DPM1 – DPM3 | 3 | Digital Panel Meter | ANALOGIC 2532-1B-1-RX-CX-A |

Figure 16A:
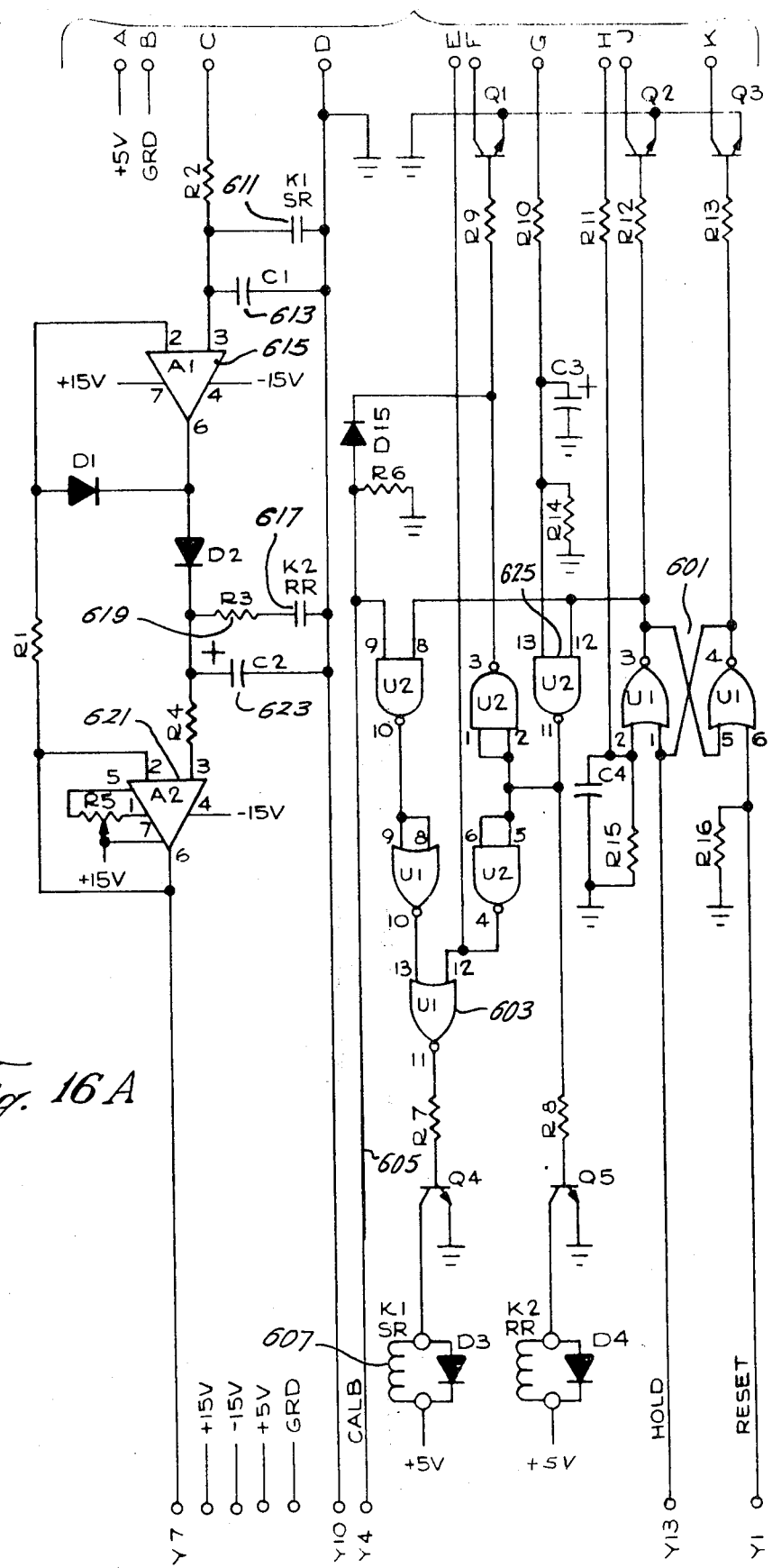
FIGS. 16A, 16B and, 16C together form a schematic view of the input board.
Figure 16B:
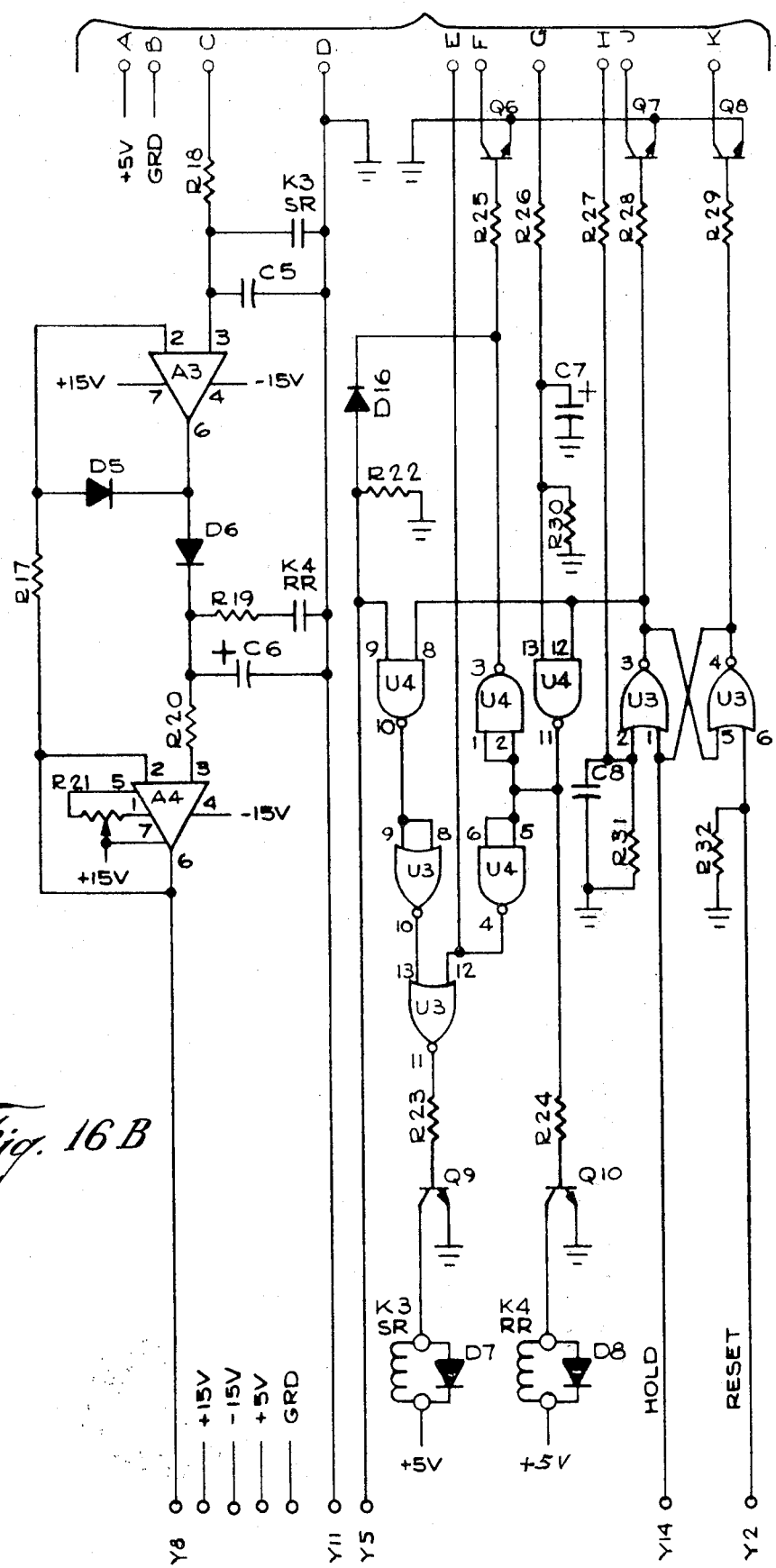
Figure 16C:
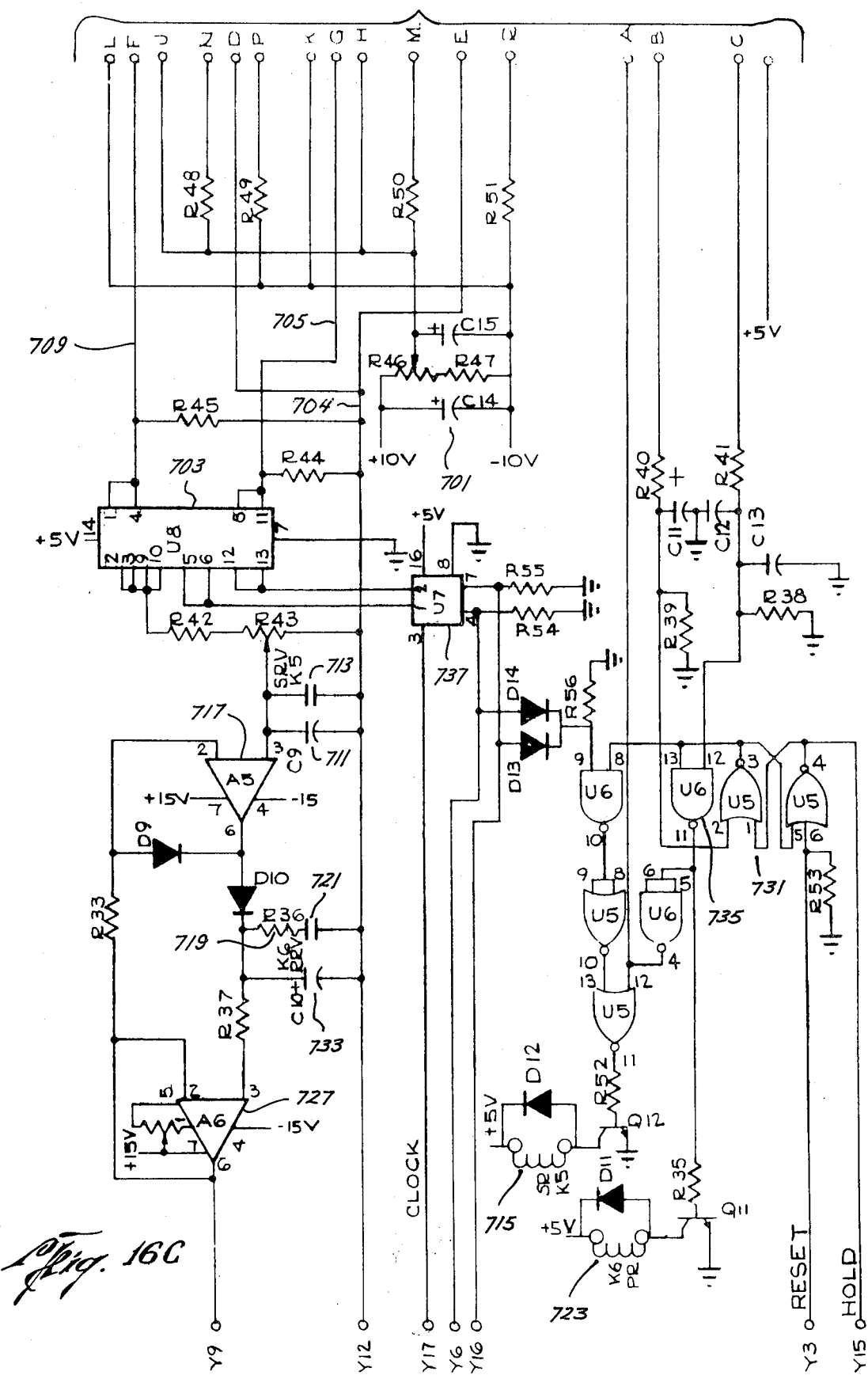

FIGS. 16A, 16B, and 16C show schematically illustrate the part of the input board that is associated with pin and box tool joint calipering and tube calipering in the preferred embodiment. The particular components in these schematics are set forth specifically in the following chart.

ac source 441. It will be seen that this circuit converts 117 volt ac electricity to direct current electricity at −15, −12, +5, +12, and +15 volts by conventional rectifier means The components used by the power supply in the preferred embodiment of the invention are set forth in the following chart.

INPUT P.C. BOARD ASSY.

| ITEM | CODE | QTY. | DESCRIPTION | MANUFACTURER AND PART NO. |
|---|---|---|---|---|
| 1 | R2,3,10,11,18, 19,26,27,36, 40,41 | 11 | Resistor, 1K, ¼W, 5% | |
| 2 | R4,6,14,9,12, 13,25,28,29, 15,16,20,22, 31,32,37,38, 39,44,45,53, 7,8,23,24,35, 30,52,54,55, 56 | 31 | Resistor, 10K, ¼W, 5% | |
| 3 | R1,17,33 | 3 | Resistor 100K, ¼W 5% | |
| 4 | R48,49,50, 51 | 4 | Resistor 4990 ohms, ¼W,1% | |
| 5 | R42 | | | |
| 6 | R47 | | | |
| 7 | R5,21,34 | 3 | Potentiometer 10K | BOURNS 3067P-1-106 |
| 8 | R43,46 | 2 | Potentiometer 1K | |
| 9 | D1 − D16 | 16 | Diodes | MILITARY 1N914 |
| 10 | A1 − A6 | 6 | Amplifier | SEGNETIC NE536T |
| 11 | U1,U3,U5 | 3 | I.C. | RCA CD4001AE |
| 12 | U2,U4,U6 | 3 | I.C. | RCA CD4011AE |
| 13 | U7 | 1 | I.C. | RCA CD4027AE |
| 14 | U8 | 1 | I.C. | RCA CD4016AE |
| 15 | C4,8,12,13 | 4 | Capacitors .01 mfd. | |
| 16 | C9 | 1 | Capacitors 5.8 mfd. | |
| 17 | C2,6,10 | 3 | Capacitors 22 mfd. | |
| 18 | C14,15 | 2 | Capacitors | |
| 19 | C1,5,9 | 3 | Capacitors .1 mfd. | |
| 20 | C3,7,11 | 3 | Capacitors 2 mfd 15V | |
| 21 | Q1 − 12 | 12 | Transistors | MILITARY CODE NO. 2N2925 |
| 22 | K1 − K6 | 6 | Relays | CHEMTRON 1117-4-1A |

POWER SUPPLY

| ITEM | CODE | QTY. | DESCRIPTION | MANUFACTURER AND PART NO. |
|---|---|---|---|---|
| 1 | U 1 | 1 | I.C. | Fairchild UA7805UC |
| 2 | U2 | 1 | I.C. | Fairchild UA7812UC |
| 3 | U3 | 1 | I.C. | Raytheon RN4194 |
| 4 | R1 | 1 | Resistor 71.5K | |
| 5 | R2 | 1 | Resistor 37.5K | |
| 6 | C1 | 1 | Capacitor 6000uf at 20V | Sangamo |
| 7 | C2–5 & C8 | 5 | Capacitor 1000uf at 25V | Sprague TVA 1211 |
| 8 | C6 & C7 | 2 | Capacitor .001 uf | |
| 9 | C9 & C10 | 2 | Capacitor | |
| 10 | D1 thru D7 | 7 | Diodes | IN4004 |
| 11 | F1 | 1 | Fuse 1 Amp S10–B10 | |
| 12 | F2 | 1 | Fuse 1/10 Amp | |
| 13 | F3 | 1 | Fuse 3 Amp | |
| 14 | T1 | 1 | Transformer | |
| 15 | | 1 | Heatsink | |

Figure 17:
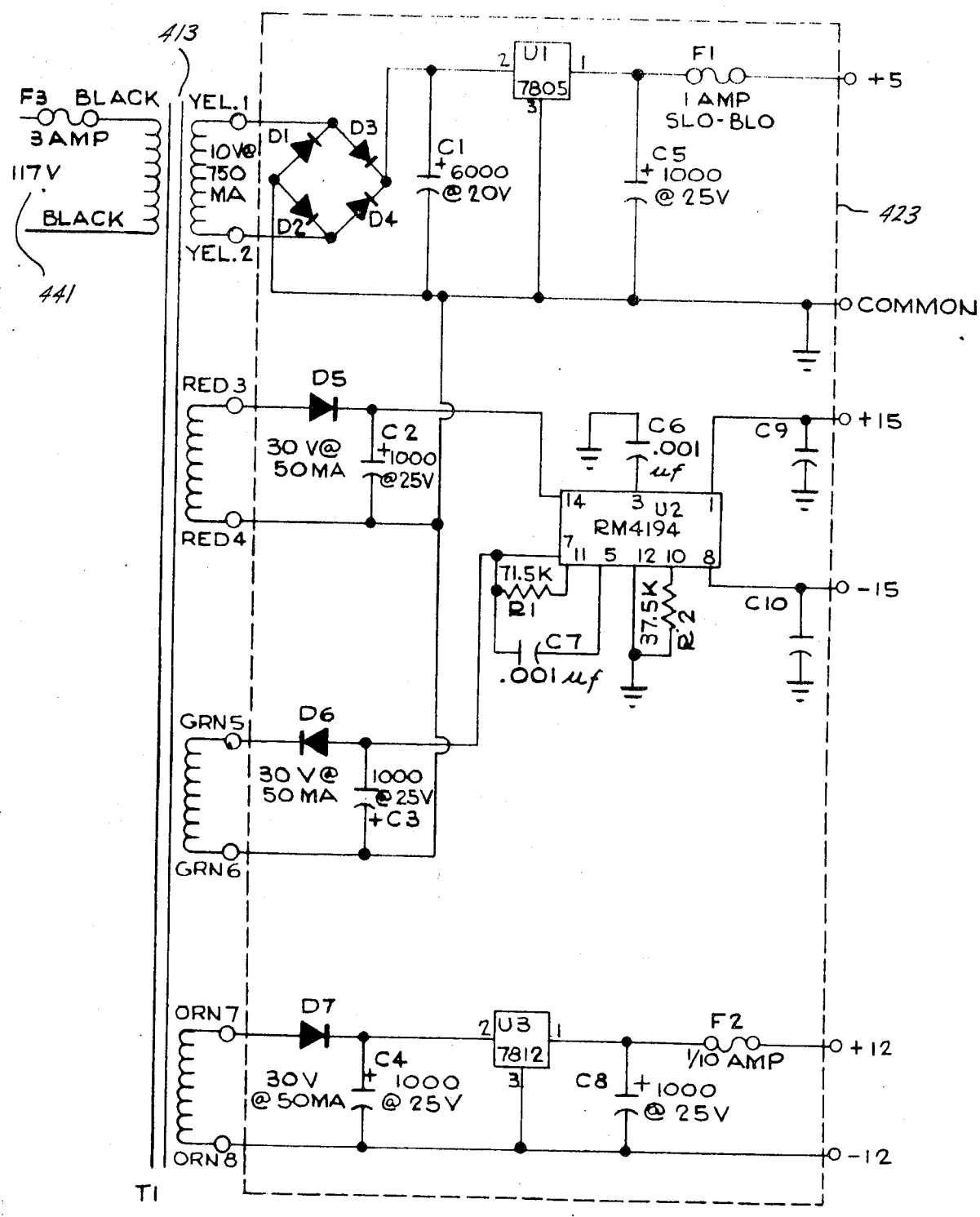
FIG. 17 is a schematic view of the power supply board.

FIG. 17 shows the schematic circuit of the power supply board 423 and transformer 413 connected thereto, the transformer being supplied from 117 volt FIG. 18 shows schematically the circuits located on the display board of the preferred embodiment. These circuits control character display LEDs 378, 379, 380 previously referred to, which indicate the grade of pipe at the pin box and tube portion. The circuits on this board also control calibration warning lights 387, 389, 391. The particular components of these preferred circuits are shown in the following chart.

DISPLAY P.C. BOARD

| ITEM | CODE | QTY. | DESCRIPTION | MANUFACTURER AND PART NO. |
|---|---|---|---|---|
| 1 | R1 – R24 | 24 | Resistor 100 ohm | |
| 2 | R26 – R31<br>R33 – R38<br>R40 – R45 | 18 | Resistor 1K,<br>¼W, 5% | |
| 3 | Q1 – Q18 | 18 | Transistor | MPS 2925 |
| 4 | D1 – D4 | 4 | Diodes | IN914 |
| 5 | U1 – U3 | 3 | I.C. | CD4009AE |
| 6 | U5 – U7 | 3 | I.C. | CD4001AE |
| 7 | LEDI – 3 | 3 | Light Emiting Diode | |
| 8 | L1 – L3 | 3 | Lamp | MONANTO MV5020 |
| 9 | S1 – S3 | 3 | Push Button Switch | Switchcraft 903-D Modified per Dwg. 4910-80 |

FIG. 19 is a schematic diagram typical of the cable that connects each hand caliper with the console. The letters designate contacts on the cable ends which connect with contacts of like designation on the hand caliper printed circuit board (See FIGS. 20 and 21) and the console input printed circuit board (See FIG. 13A).

FIG. 20A is a pictorial diagram of the circuitry at each hand held caliper including the previously mentioned printed circuit board 361, lamps 352, 353 balance adjustment potentiometer 357, calipering potentiometer 329, battery 363, and push button switch 355. Also shown are diode 443 and relay 445. The schematic circuit diagram for these same elements is shown in FIG. 20B. When relay 445 is energized, its contacts 447 close the circuit to battery 363, thereby energizing calibration potentiometer 449, calipering potentiometer 329, and balancing potentiometer 357. The latter two potentiometers form part of a Wheatstone bridge as shown in the schematic. The output of this bridge is zero when the calipering potentiometer is in its nominal position, but the circuit allows a voltage. The amplitude of the voltage is proportional to the amount of deviation and from nominal, the factor of proportionality depends upon the position of calibration potentiometer 449.

When switch 355 is closed, relay 445 is energized through the upper contacts of the switch to electrically connect the caliper electronics to the console logic means. Simultaneously, a circuit through the lower contacts of the switch is opened turns off a corresponding signal light either 393 or 395, at the console. When button 355 is released and the switch opens, relay 445 opens and terminates transmission of caliper information to the console. A circuit through the lower contacts of the switch is closed simultaneously and lights the corresponding signal light at the console to tell the console operator to make a record of the reading displayed on the readouts. Additionally, this closes a circuit to red light L2 informing the caliper operator not to do any more calipering. When the console operator has made his record and pushes the corresponding reset switch button 393, 395 a circuit is closed through path J of the schematic to light the green light L1 of FIG. 20 at the hand caliper to inform the caliper operator to proceed. Simultaneously, the red light L2 is turned off.

Reviewing FIGS. 14A through 21 the manner of assembly and interconnection of the several printed circuits, as indicated generally in FIGS. 13A and 13B, with each other and with the calipers will become apparent in the preferred embodiment of the invention. Alternating current electric power is supplied to the apparatus at 441 (FIG. 17). The transformer and rectifier circuitry shown in FIG. 17 are well known and cooperates to provide several direct current outputs at the terminals shown at the right hand side of FIG. 17 as +5, Common +15, −15, +12, −12. These terminals are connected by electric conductor wires to the several terminals of the printed circuit boards and other parts of the apparatus bearing like designations. Each of the two hand held calipers shown in FIG. 21 has terminals A–K which connect to the corresponding terminals A–K of a cable as shown at the right hand side of FIG. 19. The cable terminals A–K shown at the left hand side of FIG. 19 connect to terminals A–K of the input printed circuit shown at the top of FIGS. 16A, 16B. Similarly, the automatic calipers, whose circuit is shown in FIG. 21A, connect via a cable like that of FIG. 19, to the terminals A–P of the input printed circuit shown at the top of FIG. 16C.

The terminals designated Y1 through Y17 at the bottom of the input printed circuits shown in FIGS. 16A–C are connected by electric conductor wires 431 (FIG. 13A) to like designated terminals Y1 through Y17 of the mother board printed circuits shown at the tops of FIGS. 15A–C.

The three sets of jack connectors on the mother board, labeled J1C, J2C, J3C at the bottoms of FIGS. 15A–C, receive three sets of pin connectors, labeled P1C, P2C, P3C at the tops of the switch logic boards shown in FIGS. 14A–14C.

The six sets of jack connectors indicated by the rectangles on the mother board labeled J1A, J1B, J2A, J2B, J3A, J3B, receive six sets of pin connectors from the digital panel meters 375, 376, 377 (FIG. 12) which are plugged therein.

Figure 21E:
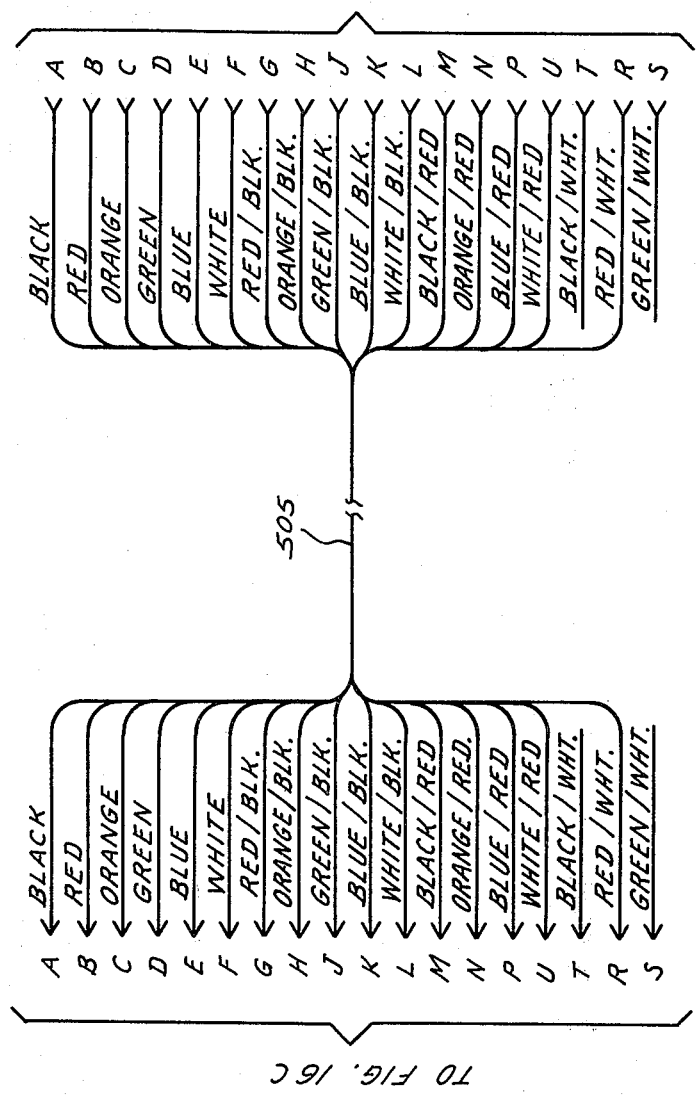
Figure 21A:
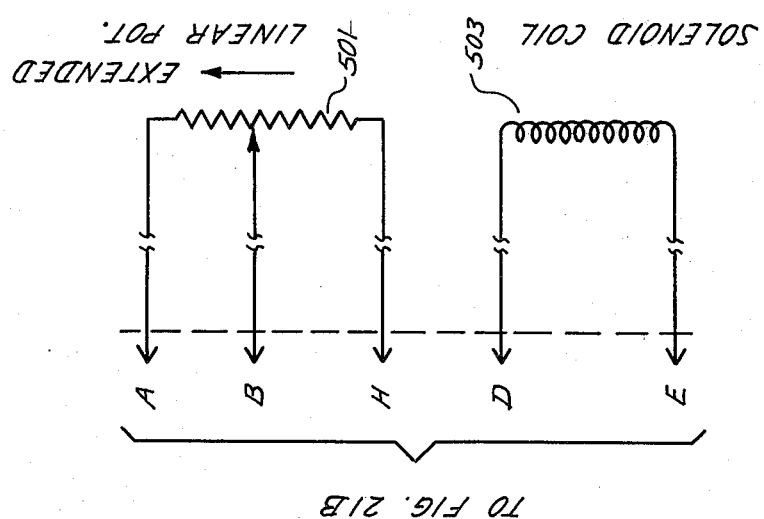

Referring now to FIGS. 21A, 21B, 21C, 21D, 21E, there is shown the electrical circuit for the tubing calipers, their power supply, and the connections therebetween and to the console. The functions of all the parts in these figures are well known to those skilled in the art. FIG. 21A shows schematically a potentiometer resistance 501 typical for each of the four potentiometers 255 and an electric solenoid 503 typical of each of the four solenoid coils 269 (see FIG. 6). Each of the four potentiometers 501 and solenoids 503 has pin connectors A, B, H, D, E at its ends which plug into jack connectors of like letter designation shown in the upper part of FIG. 21B.

FIG. 21B also shows the three trip switches 233, 235, 237. The conductors from two of the trip switches, 233, 235, and the conductors from the four sets of jack connectors leading to the conductors A, B, H, of the four potentiometer units lead to pin connectors designated on FIG. 21B as L,F,J,C,U; M,E,R,A,B; N,D,P; K,G,H. These pin connectors connect to jack connectors of like letter designation on cable 505 shown in FIG. 21E.

The pin connectors of like letter designation on cable 505 connect to jack connectors of like letter designation on the console input board shown in FIG. 16C.

The conductors from the four sets of jack connectors shown in FIG. 21B leading to conductors D and I of the four solenoids 503 are connected in parallel and together with the three conductors from trip switch 237, lead to pin connectors designated A, B, C, D, E at the right of FIG. 21B. These pin connectors are plugged in to jack connectors of like letter designation shown in FIG. 21C, which are provided at the end of solenoid power supply cable 507.

As shown in FIG. 21C, cable 507 leads to a power supply and relay unit 509. The components illustrated in FIG. 21C for the preferred embodiment of the invention are set forth in the following chart:

TUBE O.D. GAUGE POWER SUPPLY

| ITEM | CODE | QTY. | DESCRIPTION | MANUFACTURER AND PART NO. |
|---|---|---|---|---|
| 1 | R1 | 1 | Resistor, 3K, 5W | |
| 2 | D1, D2, D3 | 3 | Diode | IN4004 |
| 3 | Z1 | 1 | Zener Diode, 24V | IN4748 OR MZ 1000-21 |
| 4 | RY | 1 | Relay | P&B KUP 14D55-24VDC |
| 5 | | 21' | Cable | BELDEN No. 8449 |
| 6 | | 7' | Cord | 1W364 |
| 7 | | 1 | Connector | KPTO6A14-5S |
| 8 | | 1 | Clamp | 3057-8A |
| 9 | | 1 | Connector | MS3108B-18-19P |
| 10 | | 1 | Clamp | MS3057-10 |
| 11 | | 1 | Relay Box | BUD-CU2103A |
| 12 | | 1 | B-X CONNECTOR | T&B 3302M |

Still referring to FIG. 21C, the cable power supply and relay unit 509 is connected by a short cable 511 to a plurality of pin connectors designated C–J. A cord 513 from a plug connector to a conventional 115 volt ac power source has conductors leading to pin connectors designated A, B. The several pin connectors A–J plug in to jack connectors of like letter designation of the main power supply shown in FIG. 21D. The components of the printed circuit of the main power supply of the preferred embodiment of the invention shown in FIG. 21D are set forth in the following chart:

MAIN POWER SUPPLY

| ITEM | CODE | QTY. | DESCRIPTION | MANUFACTURER AND PART NO. |
|---|---|---|---|---|
| 1 | T2 | 1 | Pulse Transformer | Sprague 11Z2100 |
| 2 | SCR1, SCR2 | 2 | 8 amp. 400 volt | 2N4443 |
| 3 | D1, D2 | 2 | 1 amp. 200 volt | IN4004 |
| 4 | D3,D4,D5 | 3 | 12 amp. 400 volt | MR1124 |
| 5 | Z1, Z2 | 2 | Zener Diode, 22 volt, 1 watt | IN4748 OR MZ1000-21 |
| 6 | R3 | 1 | 3000 ohms, 5 watt | Ohmite 4635 |
| 7 | R1,R6 | 2 | 10K, ½ watt | |
| 8 | R2 | 1 | 330 ohms, ½ watt | |
| 9 | Q1 | 1 | Transistor | Motorola 2N4351 or 2N2646 |
| 10 | R4, R5 | 2 | 330 ohms, ½ watt | |
| 11 | C1 | 1 | .1 mfd, 200 volts | Sprague 2PSP10 |
| 12 | C4, C5 | 2 | .1 mfd, 400 volts | Sprague 4PSP10 |
| 13 | Heat Sink | 2 | | |
| 14 | Terminal Post | 6 | | USECO 1530B-Y4-11 |
| 15 | R7 | 1 | 910 ohms, ½ watt | |

Figure 21D:
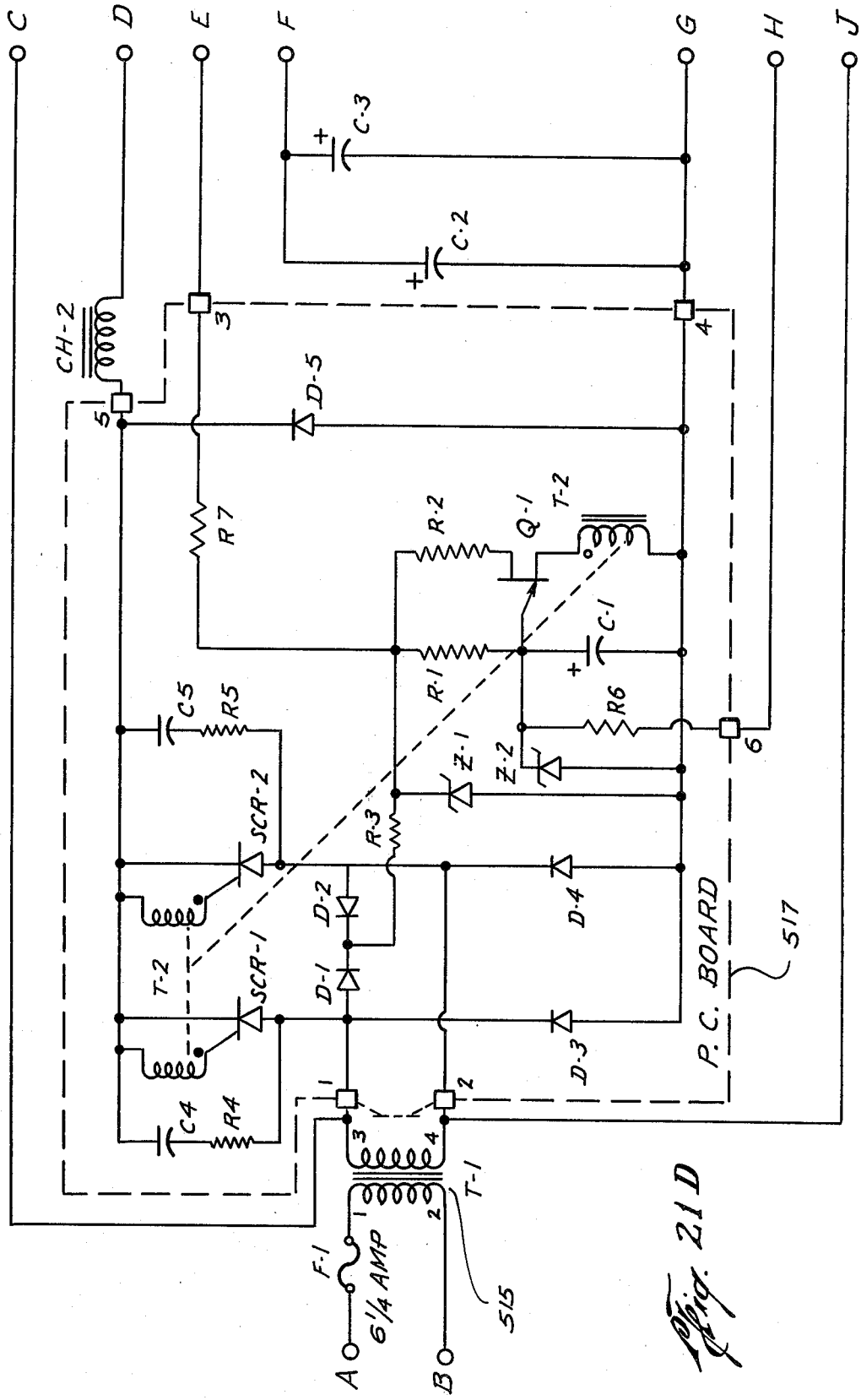

Reviewing the circuit shown in FIGS. 21A–21E, it will be apparent that ac electric power from a suitable 110 volt source is fed in through cord 513 (FIG. 21C), and is stepped down in voltage by transformer 515 (FIG. 21D). To the transformer is connected rectifier circuits of the printed circuit board 517 whose components are set forth in the preceding chart and whose operation is illustrated by the detailed schematic. Further voltage regulation and smoothing is accomplished by inductance CH-2 and capacitors C-2, C-3 shown at the right of FIG. 21D. The resultant output includes low voltage ac across jacks C and J and various dc voltage at D through H. The low voltage ac transmitted to the cable power supply unit of FIG. 21C energizes relay 519 which controls contacts RY1, RY2, RY3 of the cable power supply and relay unit 509. When trip switch 237 (FIG. 21B) is actuated by the tool joint on a pipe entering the pipe inspection machine 163 (FIG. 1), the four solenoids 503 (FIG. 21A) connected to pins DE (FIG. 21A) and jacks DE (FIG. 21B) and thence to connectors DE of the power supply, are energized to retract the potentiometers 255 (FIGS. 5 and 6). When the tool joint has passed trip switch 237, the switch opens, the tube diameter of the pipe being insufficient to keep the switch closed, and the solenoids 503 are deenergized allowing the potentiometers 255 to engage the tube to transmit information to the console via cable 505 (FIG. 21E). It will be understood that trip switch 237 is of insufficient capacity to control solenoids 503 directly; instead switch 237 controls relay 519 (FIG. 21C) which in turn through its contacts RY1, RY2, RY3, controls the four solenoids.

Trip switches 233 and 235 (FIG. 21B), are respectively the turn on and turn off switches for the automatic caliper input board at the console, FIG. 16C, being connected to the jack connectors C,U and A,B thereof when a pipe end enters inspection machine 163 (FIG. 1), it first strikes normally open turn on switch 233 which closes and prepares the associated console circuitry to receive information from the four potentiometers 501 through jack connectors L,F,J; N,D,P; K,G,H, and M,E,G at the input board shown in FIG. 16C. When the pipe entering the inspection machine strikes normally open turn off switch 235, it turns off the associated console circuitry until the tool joint has passed switch 235; whereupon the switch falls back onto the tube and recloses.

Considering now the overall operation of the electric circuit of the apparatus, electric currents are provided from each of the hand calipers whose amplitudes are related to the position of the caliper's associated potentiometer (FIG. 20B). This unbalances the local bridge circuit in the caliper. The current thus provided is transmitted via connectors C, D (FIGS. 20B, 19, 16A) to the input board. The current is accumulated in capacitor C1 (FIG. 16A), the resultant voltage across which is amplified at A1, A2, then delivered to connectors Y7, Y10 (FIGS. 16A, 15A). This signal is displayed at DPM1 (FIG. 16A) or, in the case of the other hand caliper at DPM2. This voltage is transferred from the DPM via connectors C, 9, 8, D, A, B, 5, 7, (FIG. 15A, 14A) to the switch logic board for range (Grade) sorting by U1,U2; U3,U4,U5; U5,U6,U7 in a manner well known to the art of; and returned to the mother board via connectors 4, 1, 2, 3, 13, (FIGS. 14A, 15A). The logic output comprising this grade signal is then used as an input to the display board (FIG. 18) via connectors E-7, 10, 13, 16, 4, 19 where the appropriate grade signal is displayed at the corresponding LED 378. In like manner the grade signal from the other hand caliper is displayed at LED 379.

When the console operator has recorded the grade, he closes reset switch S-1, or S-2, (FIG. 18) which connects back through connectors E4 to the mother board and thence to the switch logic board (FIG. 14A) through connectors 13 to. This pulse resets the control and grade logic in a well known manner readying it to grade the next signal to be received. The communications means between the console and calipers operators functions as follows:

A reset signal from the reset switch on the control console at Y-1 actuates flip-flop, U1,U1 at 601 to produce an output at connector J which is transmitted via Green/Black conductor (FIG. 19) to connection J at the hand caliper, turning on the green light L-1 (FIG. 20B).

When the hand caliper operator again wishes to transmit caliper signals again he actuates his switch 355 (FIG. 20B). This breaks the circuit through connectors EH (via cable of FIG. 19) to the input board (FIG. 16A) removing a signal from flip-flop 601 to disenable same until the circuit is reclosed upon switch 355 (FIG. 20B) is released. Opening of the circuit through connectors EH also allows OR circuit 603 to be disenabled, there being no input from calibration circuit 605, so that relay 607 is opened. Simultaneously, relay 609 closes the circuit through connectors G and the cable of FIG. 19 and connects it to the +5 volts source on the upper contacts of switch 355 (FIG. 20B). Deenergization of relay 607 (K1SR) opens contacts 611 which previously had discharged capacitor 613 (C1). This prepares input amplifier 615 to receive more signals. Activation of relay 609 closes contacts 617, so that a voltage can develop across resistor 619 for transmission to input amplifier 64.

Upon completion of the hand calipering operation, release of switch 355 reverses the position of relays 607, 609. This closes contacts 611 to remove the accumulated charge on capacitor 613 and opens contacts 617 to hold the accumulated charge on capacitor 623. Reactivation of switch 355 at this time will not reverse the position of the relays, for flip-flop 601 must be reset from the control console before it will send a signal to AND gate circuit 625 and thus allow the passage of the next control signal. This is the HOLD condition of the apparatus. However when the reset switch 627 (S1, FIG. 18) is closed, the flip-flop 601 is reversed and control switch 255 at the hand calipers will again operate the relays thru AND gate 625 in the manner described above.

It will be noted that as flip-flop 601 changes is condition between HOLD and RESET, power is switched between connections J and K (FIG. 16A) and then through the cable (FIG. 19) to the red and green lights L-1, L-2; the green light being on in the reset position and the red light in the HOLD position.

Although the operation of the hand caliper connected to the input circuit of FIG. 16A has been described, it will be understood that the circuit of the other hand caliper connected to the input circuit of FIG. 16B operates the same way.

Considering now the automatic calipers, the operation is similar. Referring to FIG. 16C, note that the line volt power supply 701 connects directly through connector LJ and KH (FIG. 21E) and also, via resistors R48, R49, R50, R51 through connectors NP and MR, to cable 505 (FIG. 21E) and thence to the ends of potentiometers 501 (FIG. 21A). The slides of the potentiometers connect through cable 505 and contacts F, D, G, E, to mixer 703. The resistors and potentiometers of the calipers form a double Wheatstone bridge whose combined output is applied via conductors 705, 704, 709 to mixer 703. This mixer's output is the difference between the inputs and thus the balanced pairs of potentiometers compensate for pipe movement as the pipe enters and moves through the floating head as discussed above. The output of mixer 703 is accumulated in capacitor 711 only when contacts 713 of relay 715 are open, as discussed in the section concerning control fluctuations above. The peak or maximum voltage accumulated by capacitor 711 is amplified by amplifier 717 and fed to output resistor 719. A signal appears at this output when contacts 721 of relay 723 are closed. The voltage at resistor 719 is fed to amplifier 729 and thence via connection Y9 to DPM3 (FIG. 15C) where the analog voltage is converted to digital format and then the greatest diameter departure from a present figure is digitally displayed.

From DPM3 connections C, 9, 8, D, A, B, 5, 7, a signal is fed to the switch logic board circuits described schematically in FIG. 14C. After passing through grade sorting circuitry of the switch logic board, which is well known to those skilled in the art, the resultant grade signal is conveyed via connectors 4, 1, 2, 3, 13 back to the mother board and thence via connectors E 6, 12, 15, 18, 6 to the display board (FIG. 18) where LED 380 displays a number respresenting the tubes grade. When the tube has passed through the inspection machine, the turn off trip switch 235 opens and flip-flop 731 (FIG. 16C) changes the position of relays 715, 723 to discharge capacitor 711 through contacts 713 and open contacts 721 to leaving the last voltage peak accumulated in capacitor 733. This is the HOLD condition of the prepared embodiment as described above. When the console operator has recorded the data relative to the tube, he closes reset switch 729 (S-3, FIG. 18) and this reverses the state of flip-flop 731 also reversing the electrical state of the circuits associated with relays 713, 715. This action reopens contacts 713 and allows capacitor 711 to again begin to change. Simultaneously contacts 721 are reclosed to allow voltage signals from amplifier 717 enter to amplifier 727.

It will to be observed that turn on switch 233 (FIG. 21B) operates through cable connectors CU (FIG. 21E) to connect +5 volt power supply (FIG. 16C)) to the input board logic circuit and associated relay 723 via AND circuit 735. The turn on switch must be closed for relay 723 to push up and allow any signal to pass to amplifier 727.

For calibrating each portion of the apparatus, switches 435, 437, 439 (FIGS. 14A, B, C) are moved to the calibration position (calibration 1 in the case of the automatic calipers). In this position +5 volts is supplied to the display board (FIG. 18) through connectors 11 and E19, E20, E20 of the mother board. This actuates signal lights 387, 389, 391 and supplies appropriate reference potentiometer voltages to the DPMs so that their operation can be checked at the same time the switches of the switch logic board will be independently checked.

Plus 5 volts is also supplied to controller 737 when the apparatus is in both calibration 1 and calibration 2 positions. This allows a check on clock signals received from DPM3.

Referring now to FIGS. 22A through 22I, these figures together form a schematic circuit diagram for the original prototype model of the subject invention. The first invoice for work done with this equipment is dated July 5, 1972. Even then the equipment should be regarded as experimental, for it has subsequently been extensively revised. To make up a complete circuit drawing the several lettered components of FIG. 22 should be assembled according to the following pattern:

```
C        B        A
F        E        D
I        H        G
```

Before describing the electric circuit it may be noted that the mechanical system of the pipe yard operates as follows: pipe is off loaded from a truck or rack or other adjacent support onto rollers and moved forward to adjacent rollers. Two men standing adjacent the latter rollers apply hand calipers to the tool joint box and tool joint pin to measure their outer diameters. Pipe is then moved laterally to another set of rollers and then moved axially through a floating magnetic flaw detector and tube calipers. The flaw detector locates any pits or cracks in the tube and the calipers measure the tube's outer diameter. The pipe is moved onto exit roller and off-loaded to a truck or rack.

The electric outputs of the two tool joint calipers and the floating flaw detector and the tube calipers are fed to a console where the results are displayed. There are three display units, the upper unit being for the box caliper, the middle unit for the pin caliper, and the lower unit for the tube (body) caliper. Digital displays are used to indicate how undersize the diameter is, measured in decimal fractions of thirty secondths of an inch. In addition there are three grade indicator lights for each caliper unit, each light circuit being set to turn on the light when the diameter deficiency reaches a particular point, corresponding to fair, poor, and bad pipe, no light at all indicating good pipe. Each display unit holds the maximum deficiency reading until the reset button at the left of the lights is depressed. This enables the operator of the console to take as much as is required to record the condition of each length of pipe tested.

There is a floating head for the flaw detector and tube calipers. The pipe enters the hole in the square plate forming part of the floating head and moves on through the hole in a square box behind the front plate. The floating head includes the front plate and the magnetic search coils and caliper levers supported thereon. The head is supported by a pair of rods connected to the top corners of the front plate and extending back to pivotal, spring biased, calilever support means in the box behind the head.

In the floating head are the search coils of the flaw detector which functions in a manner similar to the apparatus described in U.S. Pat. No. 3,539,914 to Pruter and McClughan. The calipers of the present invention include two pairs of lever actuated potentiometers mounted on the floating head at the back part thereof near the box. As pipe passes through the floating head the tube is engaged by the two opposed balanced pairs of calipers and whose associated potentiometers produce electrical outputs proportional to the tube diameter as measured in the vertical and horizontal planes.

There are two hand calipers for the tool joints. The joint calipers are adapted to be disposed around a joint. The joint calipers each include a fixed part having a handle to be grasped by the user. The fixed part includes a flat "gage" plate to engage the joint at one part thereof. In addition there is a movable part, including a flat "gate" plate to engage the joint at a part diametrically opposite from the fixed gage plate.

The movable part also includes a back plate to position the joint relative to the gage plates so that the joints always engage the fixed gage plate at the same point regardless of what size joints are being calipered. To achieve these result the movable part is slidably mounted relative to the fixed part for motion in a direction at a 45 degree angle to the fixed gage plate. This construction enables the use in the fixed gage plate of a potentiometer element having as its moving element a pin that is axially movable through a hole in the fixed gage plate. The pipe would then be engaged at one side by the gage plate of the "movable" part of the calipers and at the diametrically opposite point by the potentiometer pin. The "movable" part of the calipers would be locked in a position corresponding to the maximum expected diameter of the joint and the movement of the potentiometer pin would indicate departures of the diameter from such maximum. However the pin actuated potentiometer was not available at the time the prototype construction was built, so instead a lever actuated potentiometer, similar to that of the floating head, was used, the lever being actuated by relative movement of the fixed and movable gage plates. In this case the "movable" gage plate moves relative to the fixed gage plate. Even with the lever type potentiometer there is some gain in having the fixed gage plate always engage the joint at the same point on the fixed gage plate, for this eliminates any error due to uneven wear of the fixed gage plate. However the "movable" gage plate will engage the joint at different points on the movable gage plate. Of course if different calipers are used for different pipe sizes, the problem is eliminated.

"Gage plate," as used above, means the plate that contacts the joint. A similar gage plate is used in the fixed jaw of the calipers unless the construction is modified to substitute an axial pin type potentiometer in the fixed jaw of the calipers.

There are two control buttons on the joint calipers, these control the console display and also control the two indicator lights that tell the caliper operator the condition of the console display. The caliper operator can push one of the two control buttons to determine the beginning and end of his measurement of a particular joint. He pushes the measure button to start. Thereafter he moves his calipers into different circumferential and axial positions relative to the joint. The console circuit will display the minimum diameter found between the time the measure button is pushed and the time the caliper operator pushes the reset button. Meanwhile the console operator will have the console set in the clear position to receive whatever signals come from the calipers. When the reset button is pushed by the caliper operator, the console will automatically go into "hold" mode of operation as discussed above and will give the console operator time to record the values displayed on the console. During this operation the "holding" light will be lit at the calipers. When the console operator has recorded the results, he pushes a reset button to put the console back in the "clear" condition. This is signalled to the joint caliper operator by the green light coming on at the caliper. The caliper man then pushes his "measure" button and calipers the next joint.

Referring now to FIGS. 2A-I, there is shown schematically the electrical circuit of the apparatus, including both the part that is in the console and the parts that are in the joint calipers and the calipers in the floating head. The flaw detection circuit is not shown. It may be similar to that of the aforementioned Pruter, et al., patent.

Figure 22A:
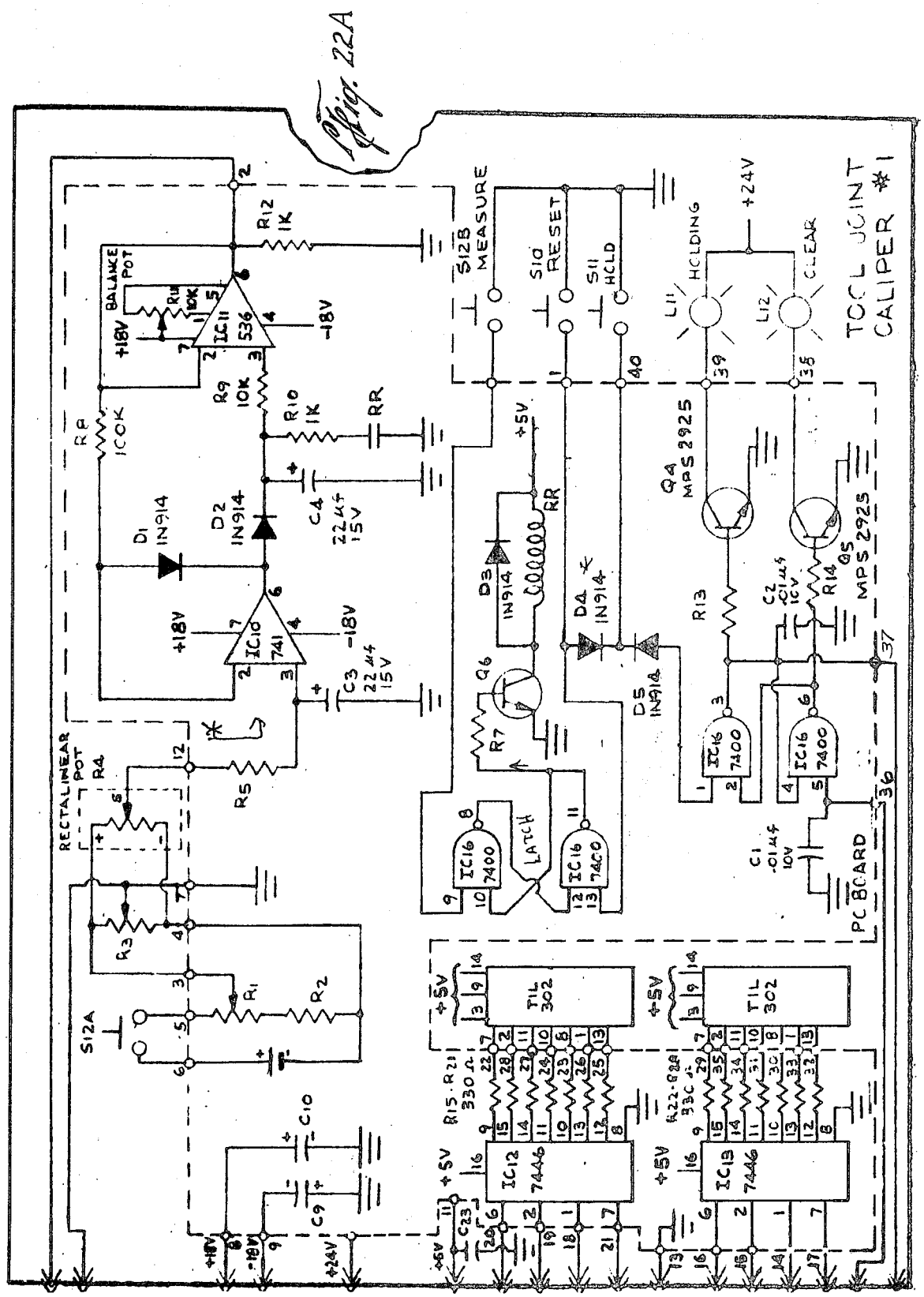
FIGS. 22A–22I together form a schematic circuit diagram for an earlier form of the invention.

In FIG. 22A, in the box, defined by the heavy line border, is the circuit for one pair of hand held calipers. FIG. 22D shows another box which includes the circuit for another pair of hand held joint calipers. FIG. 22G shows the circuit for the floating head calipers.

Figure 22B:
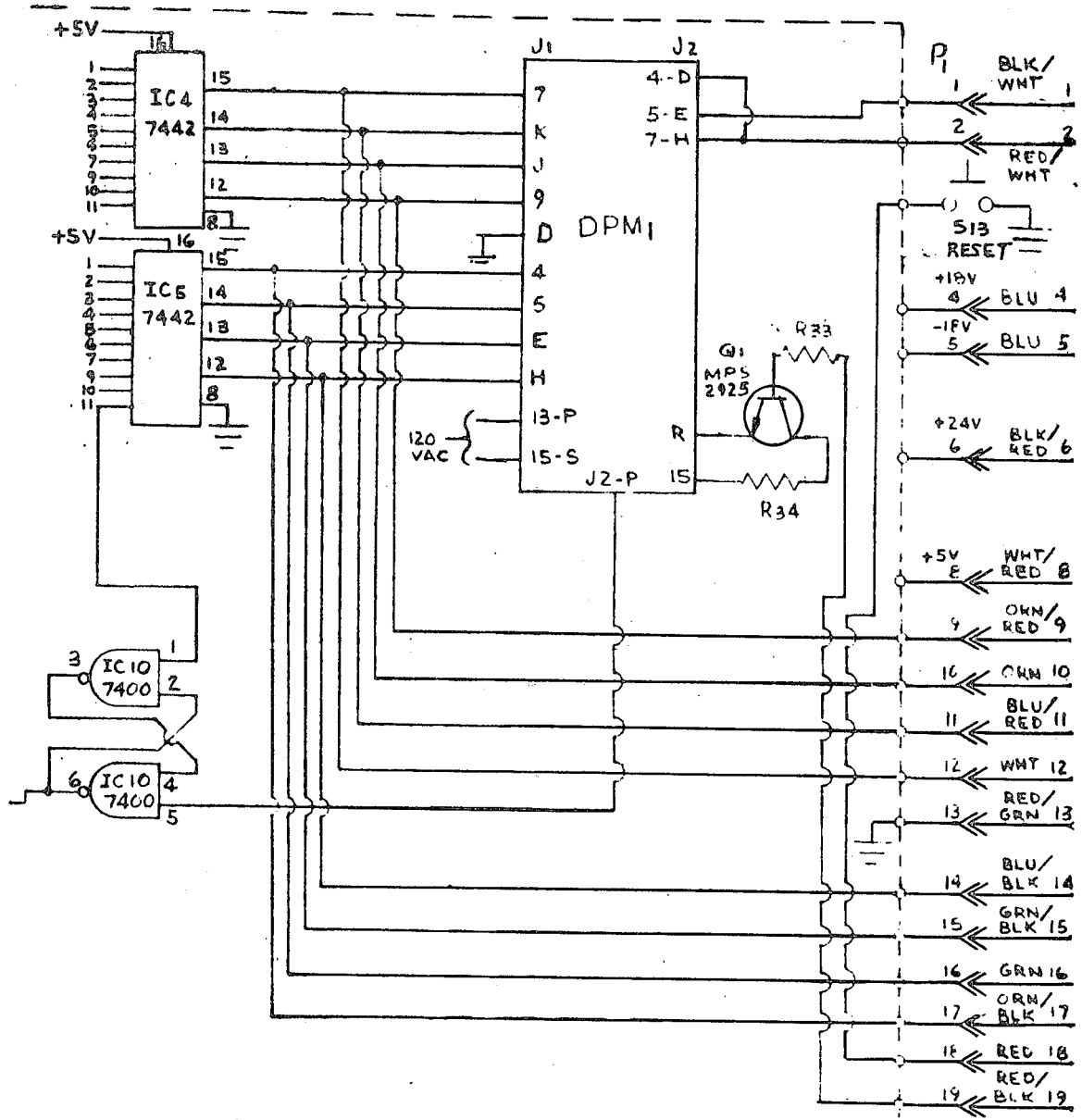
Figure 22C:
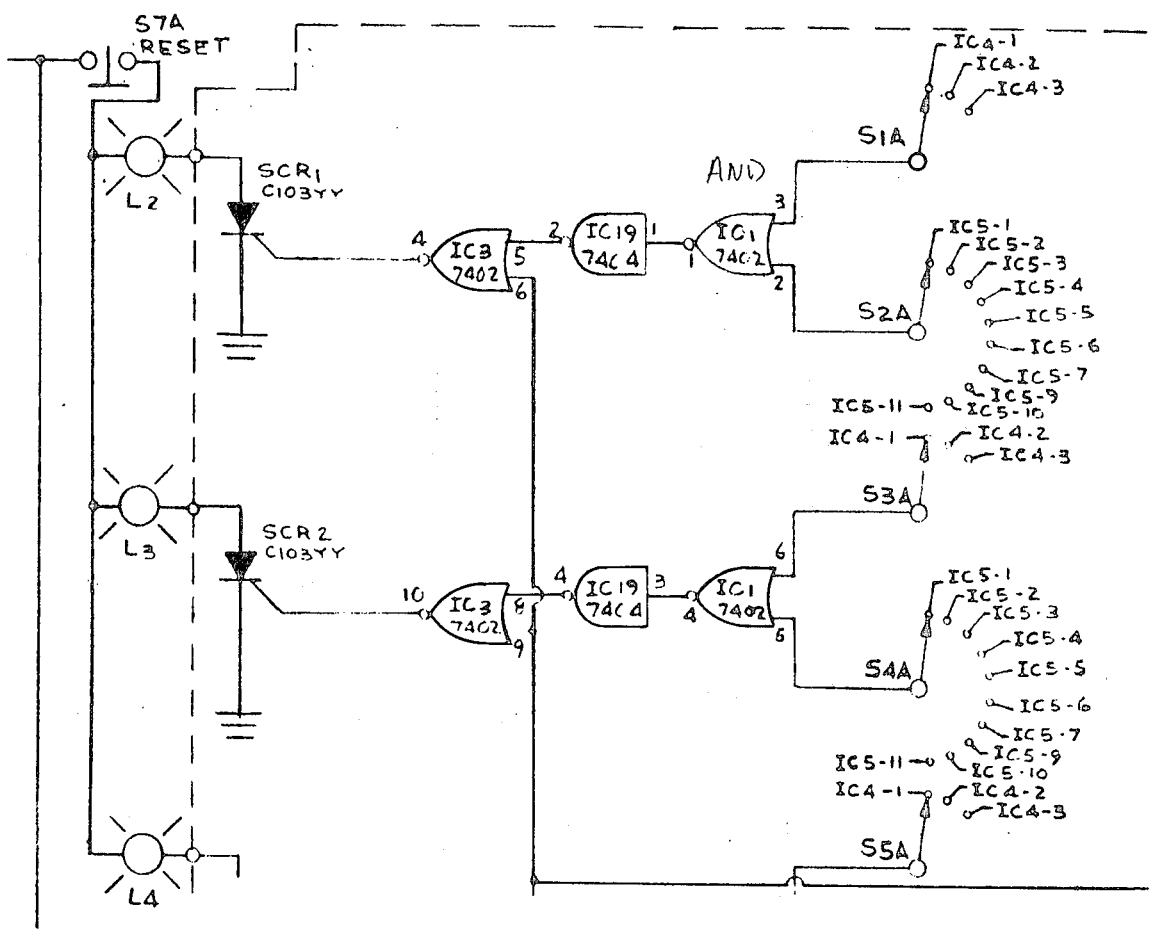
Figure 22D:
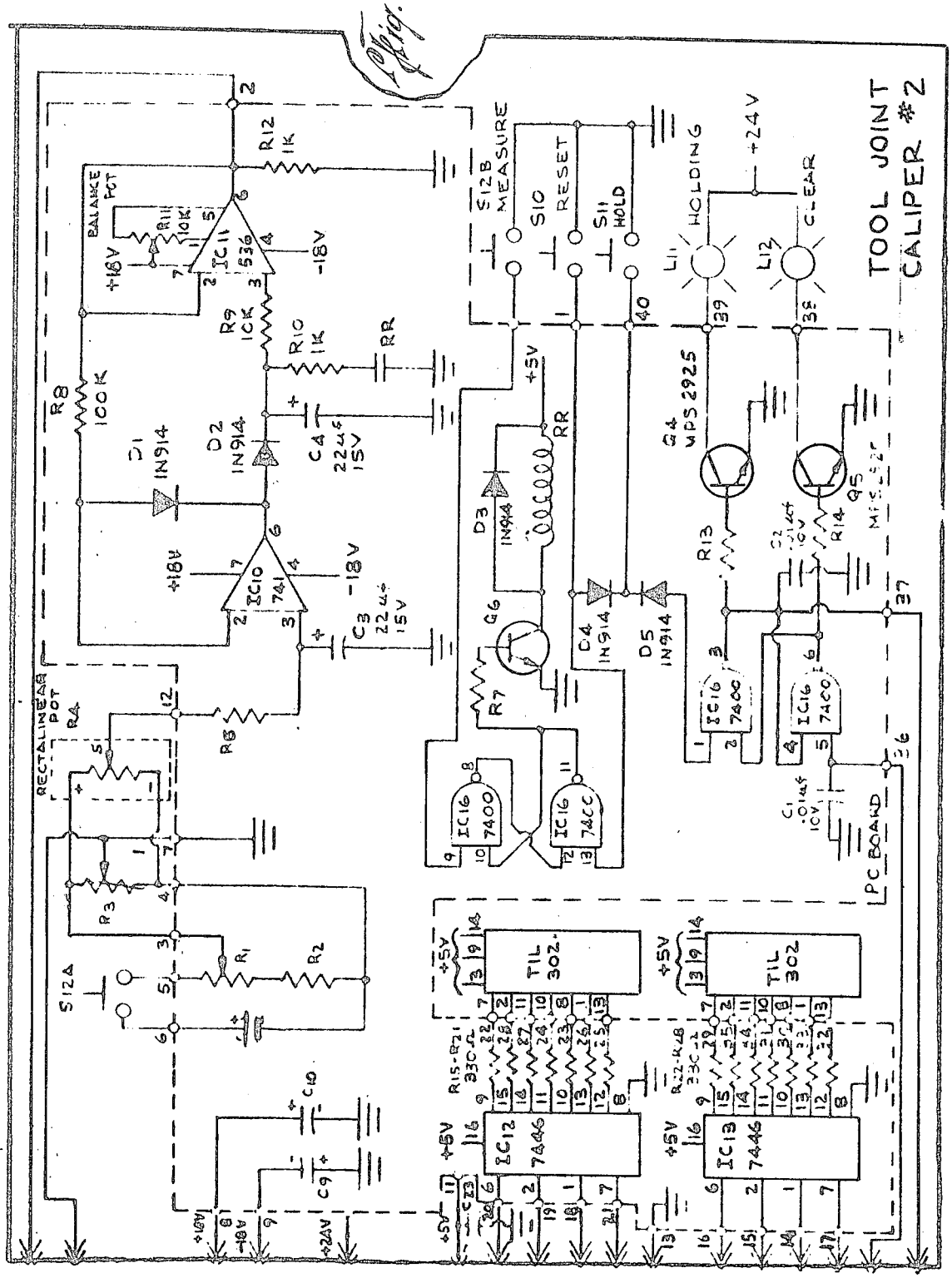
Figure 22E:
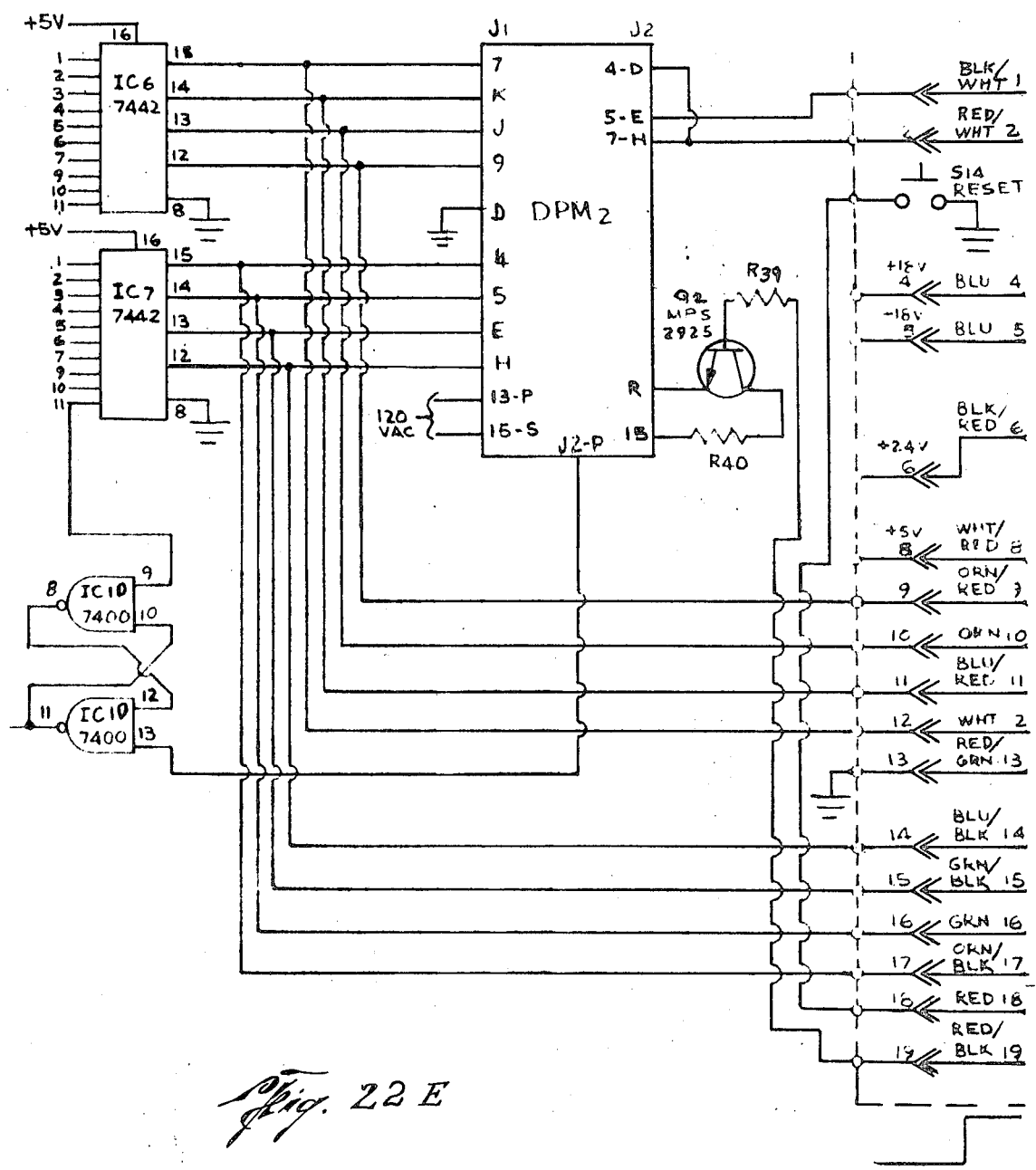
Figure 22F:
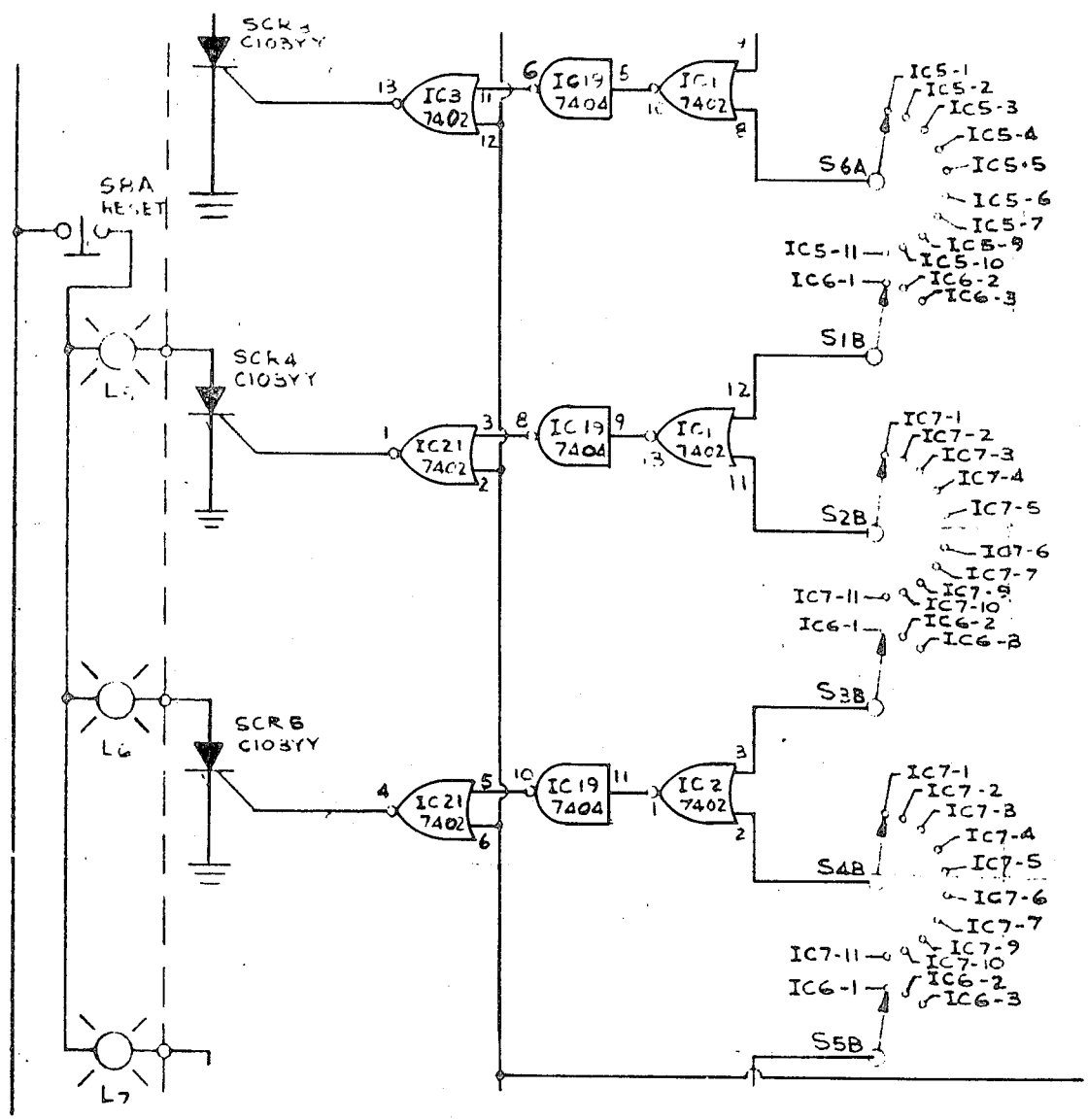
Figure 22:
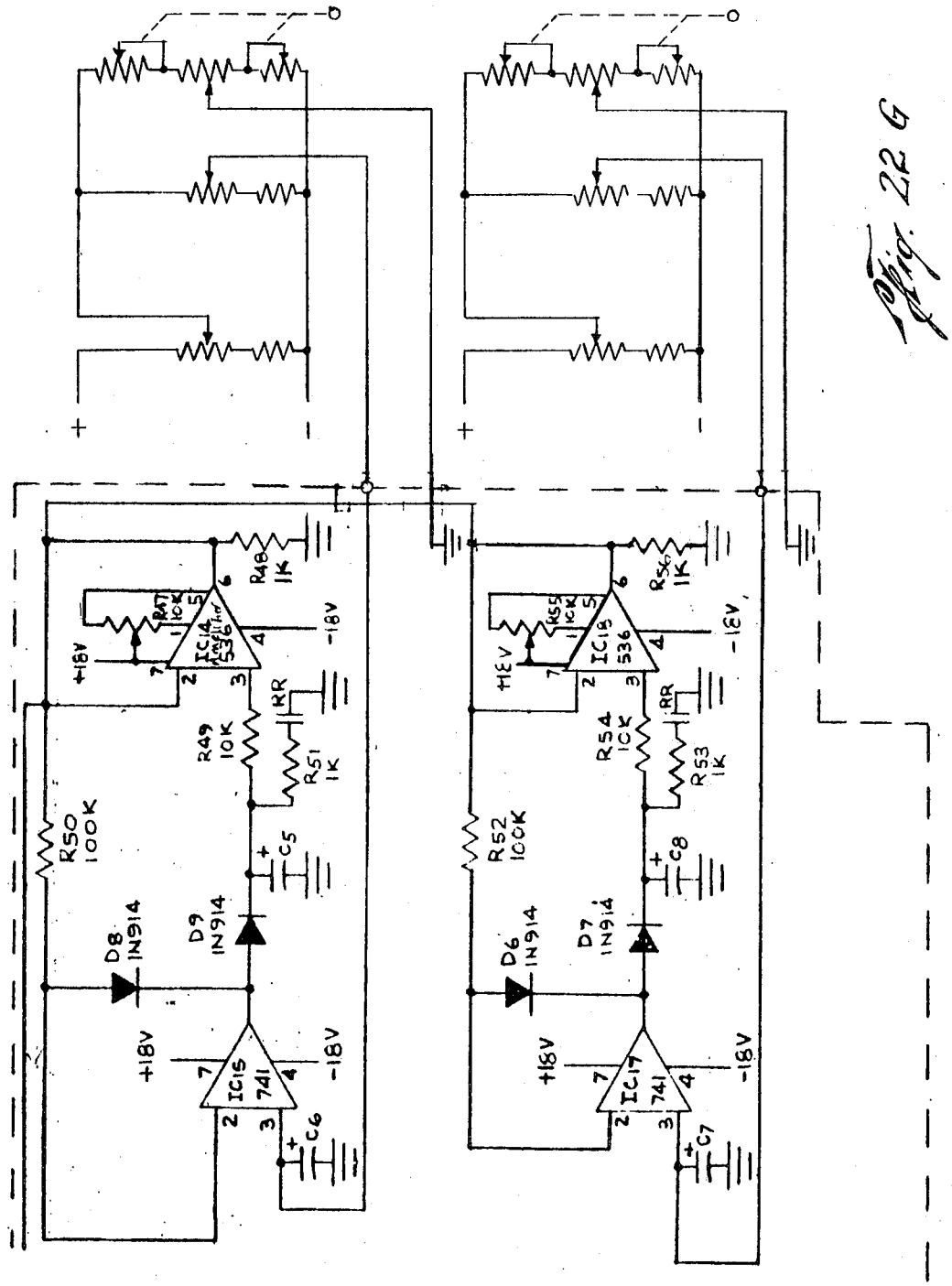
Figure 22:
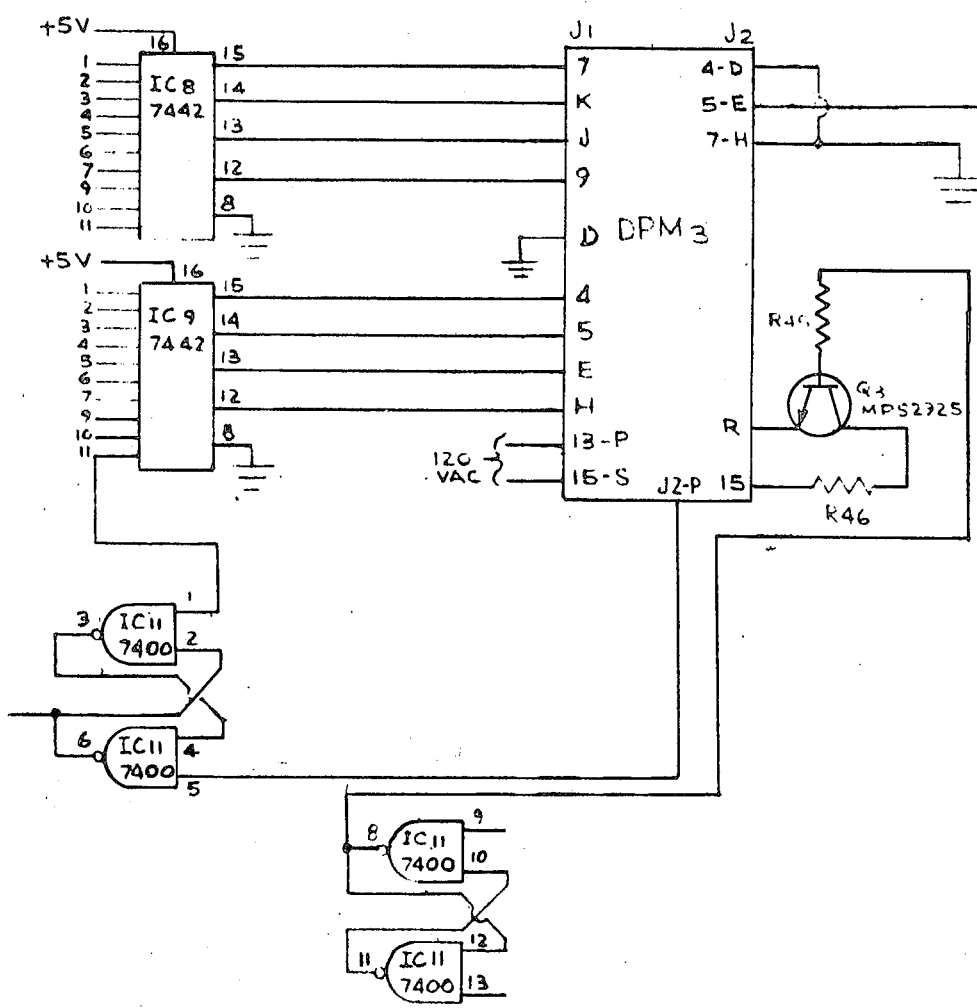
Figure 22:
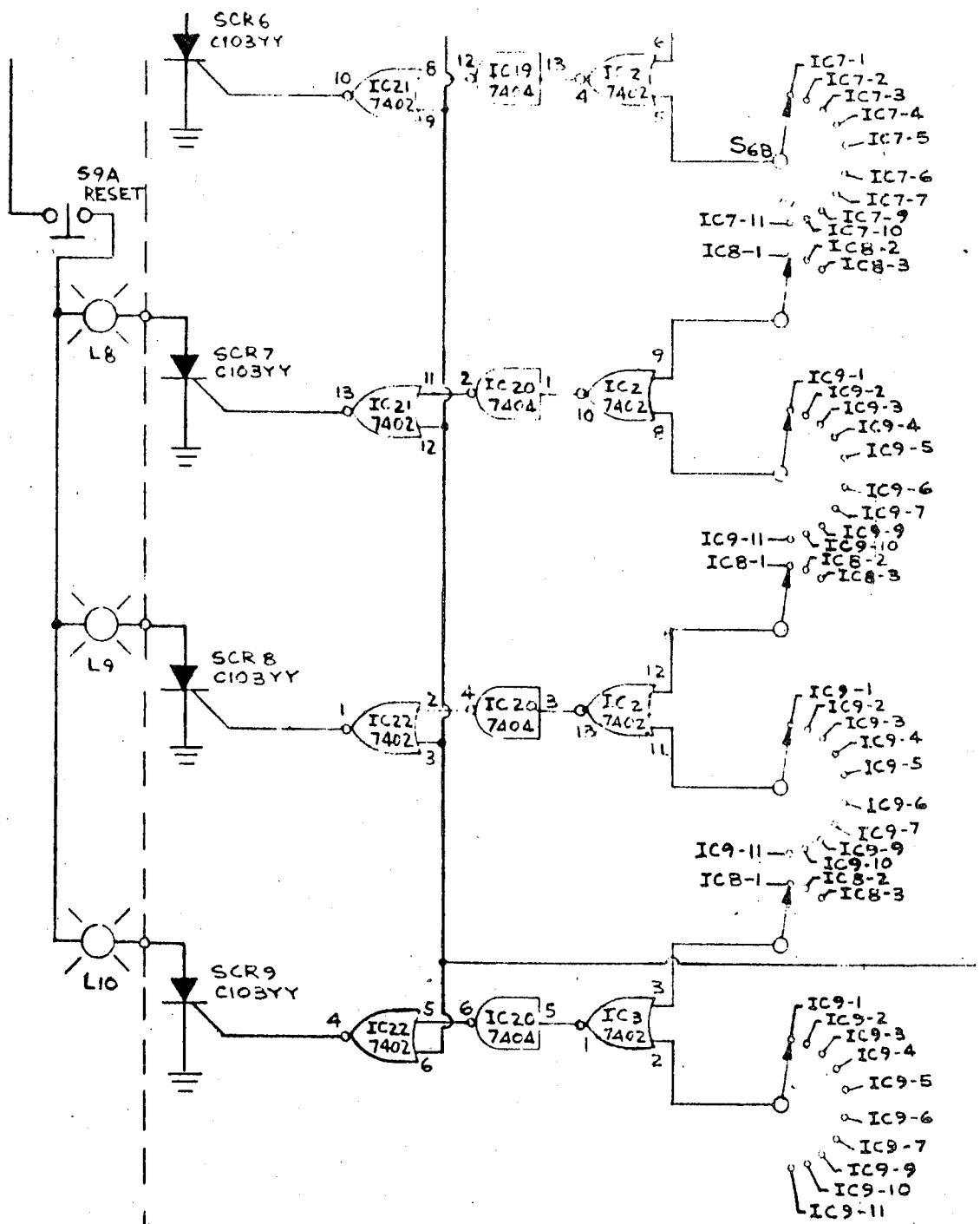

FIGS. 22B,C; E,F; and H, I show the console circuitry including, in FIGS. 22C, E, H, nine lights which indicate the grade of the pin, box, and tube be electronically compairing measurements made by the calipers with to preselected grade limits. Each light is in series with an SCR (silicon controlled rectifier) which conducts when a signal is applied to its control electrode. The signals are fed to each SCR from the three ICs (integrated circuits) immediately to the right thereof which in turn receive signals from one of the contacts of a selector limit switch that is also connected to ICs. Still progressing from left to right, the latter ICs are connected to the DPMs (Digital Panel Meters) each of which includes an analog to digital converter and a digital readout. The three DPMs produce three digital displays on the console showing tube and joint diameter departures from nominal as discussed above.

The inputs to the DPMs come from the two joint caliper circuits and tube caliper circuit shown in FIGS. 22A, 22D, and 22G as previously described.

Referring to the portion of the circuit shown in FIG. 22A, the rectilinear potentiometer has its movable contact driven by one of the tool joint calipers. The voltage output of the bridge circuit containing this potentiometer is fed to two integrated circuits to the right thereof in a well known manner and thence, back to the DPM in FIG. 22B. A similar circuit for the other tool joint caliper is shown in FIG. 22D.

In FIG. 22G is shown the circuit for the tube calipers. Starting at the upper right there is an adjustable voltage power supply which feeds a Wheatstone bridge circuit. The movable contacts of the bridge circuit are connected to the pivot arms of one opposed pair, e.g. the vertical pair, of calipers. Changes in position of the calipers due to eccentricity of the pipe (tube) relative to the floating head merely move the contacts in the same direction without creating any voltage output from the bridge, but any departure in diameter from nominal causes one caliper arm to move up and the other to move down producing an unbalance in the bridge and allows a voltage at the contacts to flow that is proportional to the amount of caliper movement. At the lower right is shown a similar bridge circuit which is provided for the other opposed, e.g. horizontal pair of calipers, which operates as described above. The horizontal and vertical voltages are then mixed, or electrically averaged, in IC V3 shown in FIG. 16C and the resulting outputs is amplified and fed into to storage capacitors C5 and C8. The voltage across these capacitors is amplified, combined and fed to DPM3 to indicate the maximum departure from the nominal diameter.

While preferred and simpler embodiments of the invention have been shown and described, further modifications thereof can be made by one skilled in the art without departing from the spirit of the invention.

I claim:

1. In drill pipe calipering apparatus having
   hand held calipering means for manually calipering at least one tool joint and producing a first electrical current having an amplitude that is a function of said joint's external diameter,
   automatic caliper means for automatically calipering a tube passed therethrough and producing a second electrical current having an amplitude that is a function of said tube's external diameter, and
   transmission means for transmitting said first and second electrical currents from the hand held and automatic caliper means to a processing means for producing a plurality of displays dependent on the amptitude of said first and second electrical currents respectfully received from said calipering means and said caliper means, said processing means including means to indicate the maximum differences between the external diameters of the tube and joint and respective preset nominal tube and joint diameters and including means to indicate the grades of the pipe joint and tube when said differences from said nominal diameters lies within a particular range
   the improvement comprising:
   first switch means located on each of said hand held calipering means and automatic caliper means for terminating the flow of said first and second electrical currents from said calipering means and said caliper means to said processing means and placing said processing means in condition to continuously produce said plurality of displays dependent on the amplitude of said electrical currents received immediately prior to said termination of said current flow.

2. Apparatus according to claim 1 wherein said improvement includes a second switch means located at said processing means for placing the processing means in condition to receive and process further flow of said first and second electrical currents from said calipering means and said caliper means and to produce said plurality of displays dependent of the amplitude on said further flow of said first and second electrical currents.

3. Apparatus according to claim 2 wherein the improvement includes indicator means physically mounted adjacent said first switch means on a manually operable portion of said hand held caliper means and is electrically connected to said processing means such that actuation of said second switch means at said processing means causes said indicator to indicate the condition of the processing means.

4. Apparatus according to claim 3 wherein the hand held calipering means comprise
   an L shaped body, an L shaped gage member inverted with respect to and adjustably secured to said body, and including a reference surface in opposition to the lower portion of said L shaped body,
   and a potentiometer having its moving contact actuator projecting through the body toward said reference surface.

5. Apparatus according to claim 4 wherein said manually operable portion of said hand held calipers means comprises an L shaped handle attached to said body, and said transmission means is an electric cable extending from said body to said processing means.

6. Apparatus according to claim 5 wherein said first switch means is mounted on said handle and selectably controls the flow of said first electrical current through said electric cable.

7. Apparatus according to claim 6 wherein the hand held caliper means are two in number, one to be used for calipering tool joint pins and one to be used for calipering tool joint boxes.

* * * * *